(12) United States Patent
Handley et al.

(10) Patent No.: US 8,627,199 B1
(45) Date of Patent: Jan. 7, 2014

(54) INCREMENTAL COMPUTING OF CHANGES TO COMPUTER USER INTERFACES

(75) Inventors: Malcolm Handley, San Francisco, CA (US); Dustin Moskovitz, San Francisco, CA (US); Justin Rosenstein, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 13/038,356

(22) Filed: Mar. 1, 2011

Related U.S. Application Data

(63) Continuation-in-part of application No. 13/017,730, filed on Jan. 31, 2011.

(60) Provisional application No. 61/299,916, filed on Jan. 29, 2010.

(51) Int. Cl.
*G06F 17/17* (2006.01)

(52) U.S. Cl.
USPC .......................................................... 715/234

(58) Field of Classification Search
USPC .......................................................... 715/234
See application file for complete search history.

(56) References Cited

U.S. PATENT DOCUMENTS

| | | | |
|---|---|---|---|
| 6,826,726 B2 | 11/2004 | Hsing et al. | |
| 7,181,684 B2 | 2/2007 | Chittu et al. | |
| 7,340,673 B2 | 3/2008 | Malone | |
| 7,805,523 B2 | 9/2010 | Mitchell et al. | |
| 7,962,547 B2 | 6/2011 | Kern et al. | |
| 7,984,137 B2 * | 7/2011 | O'Toole et al. | 709/224 |
| 8,239,756 B2 | 8/2012 | Maes et al. | |
| 2009/0235156 A1 | 9/2009 | Wake et al. | |
| 2010/0313149 A1 | 12/2010 | Zhang et al. | |

OTHER PUBLICATIONS http://ambassadortothecomputers.blogspot.com/2010/05/how-froc-works.html, (May 7, 2010), 12 pgs.
Meyerovich, Leo, et al., "Flapjax: A Programming Language for Ajax Applications", Department of Computer Science, Brown University, Providence, Rhode Island (CS-09-04), (Apr. 2009), 21 pgs.
"U.S. Appl. No. 13/017,730 , Response filed Oct. 1, 2012 to Non Final Office Action mailed Mar. 30, 2012", 12 pgs.
"U.S. Appl. No. 13/017,730 , Response filed May 29, 2013 to Final Office Action mailed Dec. 6, 2012" 58 pgs.
"U.S. Appl. No. 13/017,730, Final Office Action mailed Dec. 6, 2012", 16 pgs.
"U.S. Appl. No. 13/017,730, Notice of Allowance mailed Jun. 27, 2013", 23 pgs.
Whitmer, Ray, "Document Object Model XPath", (Feb. 26, 2004), 1-16.

* cited by examiner

*Primary Examiner* — Doug Hutton, Jr.
*Assistant Examiner* — Tionna Smith
(74) *Attorney, Agent, or Firm* — Schwegman Lundberg & Woessner, P.A.

(57) ABSTRACT

A method is provided to update information in a computer system comprising providing a reactive value hierarchy structure in a non-transitory computer readable storage device; in response to a change in a reactive value corresponding to a node in the hierarchy, marking nodes within the hierarchy that share as dirty a path with a node corresponding to a changed reactive value; traversing down through the hierarchy to a level where a reactive value is located that is either dirty or clean; if the reactive value is dirty, traversing back up to a dependent node in the hierarchy and compute a new reactive value and repeating the traversing down step; if the reactive value is clean, traversing back up to a dependent node and repeating the traversing down step; and producing at least one side-effect in the computer system in response to a compute of a new reactive value.

16 Claims, 15 Drawing Sheets

INCREMENTAL COMPUTING OF CHANGES TO COMPUTER USER INTERFACES

CLAIM OF PRIORITY

This application is a Continuation-in Part of and claims the benefit of priority under 35§120 to U.S. patent application Ser. No. 13/017,730, filed on Jan. 31, 2011, which claims the benefit of priority under 35 U.S.C. §119(e) to U.S. Provisional Patent Application Ser. No. 61/299,916, filed on Jan. 29, 2010, the benefit of priority of each of which is claimed hereby, and each of which are incorporated by reference herein in its entirety.

TECHNICAL FIELD

The present application relates generally to the technical field of computing incremental changes to information provided through a user interface of a computer connected to a computer network and, in one specific example, to web-based reactive computing of incremental changes to a user interface.

BACKGROUND

Multiple factors, such as increasing broadband connectivity, the inconvenience associated with computer viruses and hardware redundancy, and the emergence of advertising supported software as a business model, have bolstered the migration of the functionality of locally stored software applications to network based web applications.

Web applications can require communications over a network with a server, such as a web or database server, which introduces latency issues that affect responsiveness, especially in comparison to locally stored applications. Current web application implementations seek to minimize the effects of latency on application performance by reducing the number of queries and the amount of transmitted data. This can be accomplished by requesting only the altered data and by dynamically updating affected elements of an HTML document, rather than reloading the entire HTML document. Moreover, a user interfaces may present data that is complex or abundant requiring significant effort to keep the data up to date. The operations defining the data to be queried for and updated and how to update an HTML document are often accomplished through customized software. The creation and maintenance of the customized software can require significant developer resources.

SUMMARY

In one aspect, a method is provided of determining which reactive values of a reactive value hierarchy encoded in a computer readable storage device need to be recomputed in response to a change in at least one reactive value of the hierarchy and in what order so that a reactive value is recomputed only if at least one of its inputs has a different value and only if the reactive value is still in use and will still be in use even after all of the changes to reactive values in the hierarchy have been determined.

In another aspect, a tangible side-effect is produced in a computer system in response to a compute of a new reactive value.

These and other features and advantages of embodiments of the invention will become apparent from the following description of embodiments thereof in combination with the appended drawings.

BRIEF DESCRIPTION OF THE DRAWINGS

Some embodiments are illustrated by way of example and not limitation in the figures of the accompanying drawings in which.

DETAILED DESCRIPTION

Figure 1:
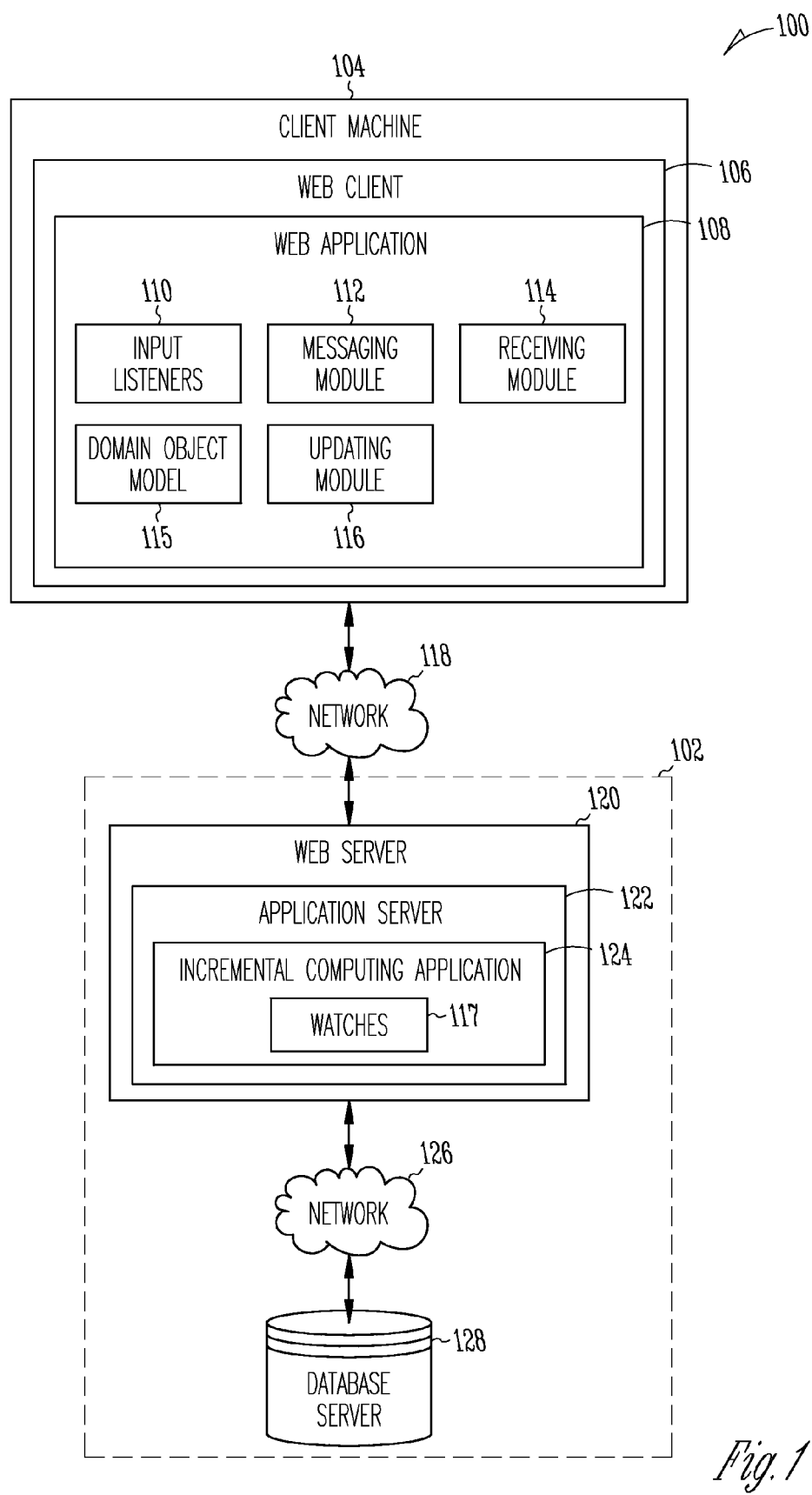
FIG. 1 is an illustrative block diagram of a system for implementing web-based incremental computing, according to an example embodiment.

Example methods and systems for supporting incremental computing are described. In the following description, for purposes of explanation, numerous specific details are set forth in order to provide a thorough understanding of example embodiments. It will be evident, however, to one skilled in the art that the present invention may be practiced without these specific details. As used herein, the term "or" may be construed in an inclusive and exclusive sense. Items that appear in multiple drawings are labeled with identical reference numerals in each drawing.

Web applications, such as applications presented via a browser and accessed over a network, provide application users and application developers with certain advantages over locally installed applications. An application developer can design a web application to conform to internet standards to ensure cross-platform compatibility (e.g., Windows, Linux) and a consistent user experience across platforms. Web applications also allow an application developer to update and maintain an application without the need for distributing and installing updates on a user's computer. An application user can access the web application from any device that supports a web client without needing to locally install the application.

The popularity of web applications and the maturation of web application technologies has resulted in a growing focus on areas such as software as a service (SaaS) and cloud computing. The demand for web applications and their related products also has resulted in increasingly complex web applications that require greater amounts of data and computational resources while simultaneously supporting a responsive and rich user experience mirroring the user experience provided by locally installed applications.

Complex web applications can be difficult to write as they depend on data and instructions received over a network from a server. Expensive round trips to a server, such as, but not limited to, a query from a client to a server for data and a response message from the server back to the client, or a similar set of queries between. a web server and database server or a data requestor and a data provider, are affected by network latency that may frustrate a responsive user experience. Latency increases with the amount of data requested. In contrast, locally installed applications may access data from a local disk over a hardware bus with a lower latency.

Application developers can reduce the effects of network latency by defining the round trip server queries to fetch relevant data values and by dynamically updating select elements of a webpage based off the fetched data. One method for reducing the amount of data transmitted to update a webpage is to query for data that has been altered, as opposed to reloading an entire webpage. For example, assume that an HTML document presenting a list of data points should be updated when a data point of the list is altered. Rather than requesting from the server the entire HTML document and the entire list of data points, a web application can retrieve only the altered data point and dynamically update the element of the HTML document corresponding to the altered data value, while maintaining the unaffected elements of the HTML document. In an example embodiment, a data value change may affect more than one element of a webpage. However, the customized software defining when and how to update elements of a webpage can be more complex than the operations supporting the main functionality of the web application. In addition, changes to the functionality of the web application may result in changes to the customized software, which may be highly nuanced and difficult to modify. Thus, the production and maintenance of web applications currently may include involvement with customized software, which can often be time consuming and inefficient.

According to an example embodiment, a web technology framework may permit an application developer to design and write a web application and have the customized software controlling updates to webpage elements be automatically generated. in one embodiment, efficient creation and maintenance of web applications is enabled by analyzing source code to generate code that monitors data values which affect what is displayed to a user and that automatically updates webpage elements when a change in data values occurs.

Incremental computing, also referred to herein as reactive computing, is a paradigm in which a data value change causes only those outputs which depend on the changed data value to be recomputed. Alternatively stated, an incremental computer program is a program that after a certain kind of input change computes new results based on the previously computed result. A related idea is reactive programming, which is a programming paradigm where data values change over time in reaction to certain events. In contrast, for example, in a traditional imperative computing environment, the function A=B+C assigns a value to A at a particular time which does not change if the value of B later changes. In a reactive programming environment, A is a dynamic value, or a behavior, whose value updates whenever the value of B or the value of C changes. An example of a reactive program is a spreadsheet program. Some cells of a spreadsheet may be defined with a value, e.g., a number, while other cells are defined in terms of values computed using other cells, e.g., formulas. Thus, in a reactive programming spreadsheet application, a cell C1 that is defined as (cell A1+cell B1) will change its value when the value of cell A1 changes, as a function of reactive programming. Moreover, in an application of incremental computing, when the value of cell A1 or B1 changes, the spreadsheet application will re-compute the value of C1 but not other cells unrelated to A1 or B1 that are displayed. In an example embodiment of incremental computing, a data value change may cause only certain elements of a webpage to be altered. In a further embodiment, web applications can be written to support incremental computation, which minimizes the amount of data transmitted from a server and defines when data should be transmitted.

As used here, the term 'function' signifies a portion of a computer program that performs a specific task. As used herein, a function is a type of procedure or routine. As used herein, a function performs some operation and may or may not return a value. As used herein, the term 'process' signifies a running (i.e. executing) computer program or portion of a computer program such as a function.

Systems that conform to the principles of incremental computing and reactive programming may build a dependency graph to capture the nature of the data dependences. A dependency graph is a directed graph and may assist in the effective propagation of changes and recalculations when a data value changes. A dependency graph represents the dependencies of objects towards each other. A dependency graph may represent the evaluation path of a function and the data values and evaluated expressions that it depends upon. In an example embodiment, non-root nodes in a dependency graph that have no children represent atomic data values of the system. In an example embodiment, such atomic data values may be a string, integer, or a structured object recognized by the system, such as a list. For sake of brevity, non-root childless nodes in a dependency tree will herein be described as "mutable values." Other nodes that are defined by and depend on "mutable values," or nodes with children, for sake of brevity, are herein described as reactive values or "R values." As used herein, the term reactive value or R value signifies an object or data structure encoded in a computer readable storage device that can compute a value and keep track of enough information (inputs and dependents, for example) that a framework knows when to recompute that value. A reactive value comprises a handle to a value that can change over time.

A node of a dependency graph with no parent represents the output of the function, and is also an R value. An R value whose function has a 'side-effect' is referred to as a 'watch'. A 'side-effect' is a modification of a state, a tangible impact on the outside world or an observable interaction with a calling function. For example, a function which emphasizes change in the state of variables, e.g., x=x+1, has a side-effect. A side-effect may involve modification of a DOM, changing mutable variables or altering some other data structure encoded in a computer readable storage device, for example.

Changes propagated to a webpage, such as in an incremental computing and reactive programming paradigm, can be accomplished through a webpage's document object model (DOM). A DOM is a platform and language neutral interface that allows programs and scripts to dynamically access and update the content, structure, and style of a webpage. The DOM provides an interface (API) to get, change, add and delete HTML/XML elements and values. A DOM defines a webpage in a tree structure with various element and node types, which may mirror the elements of the webpage. DOM nodes may be dynamically edited to edit the webpage, and the tree of DOM nodes may be traversed through the API.

In an example embodiment, a web application maintains a dependency tree to determine which nodes of the DOM of a webpage to update and how, when a mutable value changes. In an example embodiment, an application developer can write an application and provide it to a compiler. The compiler may then analyze the source code and output interpreted code, such as, but not limited to, JavaScript, that runs on a web client or web server that implements an incremental computing system. The incremental computing system may monitor displayed data values and execute functions and access the DOM to incrementally update the webpage when a data value changes.

FIG. 1 is an illustrative block diagram of a system 100 for implementing web-based incremental computing, according to some embodiments. The system for implementing web-based incremental computing contains a web application host system 102. The web application host system 102 hosts data and may compute instructions to support a web application 108. The web application 108 is an application accessed through a web client 106 over a network 118, such as a communications network embodied by the internet or an intranet. The web client 106 may be, but is not limited to, MICROSOFT INTERNET EXPLORER®, SAFARI®, OPERA®, a graphical web browser or a mobile application. The web client 106 is executed from a client machine 104, such as, but not limited to, a personal computer, cell phone, mobile device or machine capable of launching a web client 106.

The web application host system 102 distributes data to the web application 108 through a web server 120. The web server 120 may host or access an application server 122, such as, but not limited to, an APACHE APPLICATION SERVER®. The application server 122 hosts various applications that control and prepare data, including, but not limited to, an incremental computing application 124.

The incremental computing application 124 collects and sends data to the web application 108. In an example embodiment, the incremental computing application 124 may provide push notification to the web application 108 when data values have changed. The incremental computing application 124 accesses a database server 128 through a network 126, such as the internet or an intranet, to collect data which is provided to the web server 120. Content gathered for the web server 120 is communicated to the client machine's 104 web client 106 to support in the execution of the web application 108.

The web application 108 presented by the web client 106 may be updated when data values change. The web application 108 recognizes a data change through an input listener 110 or a receiving module 114. The input listener 110 may capture user input or the occurrence of a trigger event. In an example embodiment, mouse clicks, keyboard input, mouse movement, or other user input, or a trigger event such as the arrival of a certain time, may cause a data value change and be captured by the input listener 110. For example, user input such as a mouse click may check a box which changes a data value, propagating a change to the web application 108. The receiving module 114 may also notify the web application 108 of data value changes. In an example embodiment, the incremental computing application 124 may monitor the relevant data values stored on the database server 128 and push a notification to the web application 108 through the receiving module 114. In an example embodiment, the web application periodically polls the web server 120 and the incremental computing application 124 using the messaging module 112 to check whether data values have changed. The data values may be stored in the database server 128, on the web server 120, with the web application 108, or with the incremental computing application 124. In an example embodiment, the notification of a data value change that has a side-effect is enabled by a watch 117 acts as a reactive value that is notified of changes just as other reactive values are notified of changes.

When the web application 108 is notified of a data value change by the input listener 110 or the receiving module 114 an updating module 116 is called to propagate changes. As explained in copending commonly assigned patent application Ser. No. 12/932,671, filed on even day herewith entitled, SERVER SIDE USER INTERFACE SIMULATION, which is expressly incorporated herein by this reference, in some embodiments, the same incremental computing code is run on both the server and the client so as to propagate changes the same way on the server and on the client so that the server loads any new values that must be sent to the client.

In an example embodiment, the data value change notification may include the new value of the data. The propagated changes may include changing what is displayed by the web application and may entail further data queries sent through the messaging module 112 and received by the receiving module 114. In an example embodiment, the updating module 116 receives notification of a data value change and propagates that change to the web application 108 by accessing the DOM 115 of the web application to alter affected elements. In an example embodiment, the watches 117 cause changes to the web application 108 by executing functions, which may be facilitated by the updating module 116, which accesses the DOM 115 of the web application and alters affected elements. The watches 117 are part of the incremental computing application and are used to update the DOM. In an example embodiment, we use values with side-effects, called watches, to update the DOM in response to changes in other rvalues.

Figure 2:
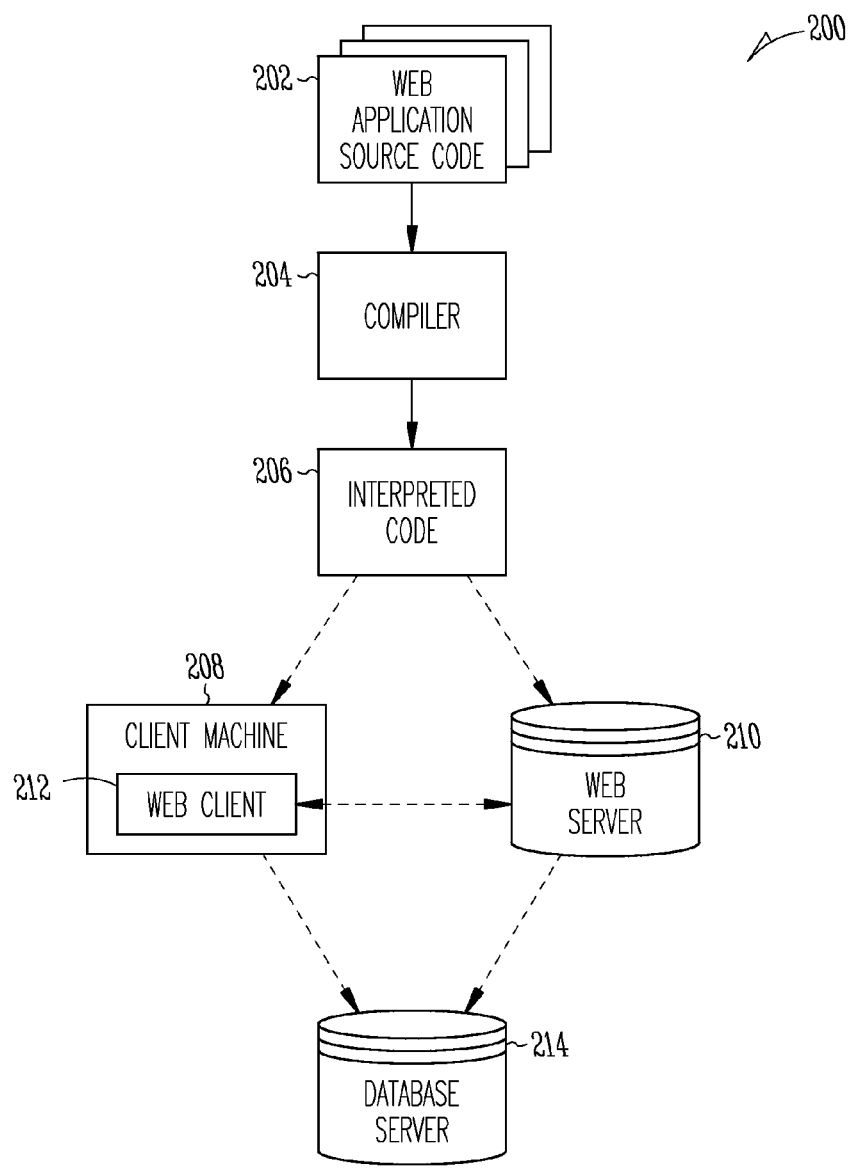
FIG. 2 is an illustrative block diagram of a system that analyzes web application source code and implements web-based incremental computing, according to an example embodiment.

FIG. 2 is an illustrative block diagram of a system 200 that analyzes web application source code and implements web-based incremental computing, according to an example embodiment. An application developer may write source code 202 defining a web application. In an example embodiment, the web application source code 202 is written in a functional language or a side-effect free imperative language implementation, which means that the code is written in an imperative language and care is taken to ensure that the code does not create side-effects. The source code may be side-effect free only for a limited duration. The application may he written to assume random access to data stored on the web server 210 or a database server 214. The web application source code 202 is provided to a compiler 204 that may translate the source code 202 to interpreted code 206, such as, but not limited to, JavaScript or other functional or imperative languages that may be run on a web client 212, such as, but not limited to, MICROSOFT INTERNET EXPLORER®, a web server 210 or any machine that may request data from a server. In an example embodiment, the compiler provides JavaScript code that can be run on the web client 212 of a client machine 208 or a web server 210. Alternatively, the code can be written directly in JavaScript so as not to require a compiler. The code 206 implements the process of monitoring data value changes and updating data presented through the web application 108, specifically, user interface data, in a fashion compliant with the tenants of incremental computing. In an example embodiment, the interpreted code 206 monitors data values through watches that update the web application through the DOM of the webpage. A web client 212 on a client machine 208 may execute the interpreted code 206 to monitor and request data from a web server 210 or a database server 214. A data request to the web server 210 may result in a query from the web server 210 to the database server 217. The interpreted code 206 may also be executed on a web server 210 to request data from a database server 214 or to push data and instructions to the web application 108.

Figure 3A:
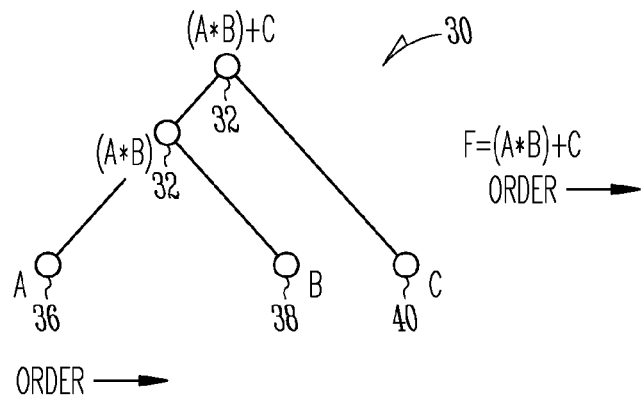
FIGS. 3A-3B are illustrative drawings of a first reactive value hierarchy structure (FIG. 3A) encoded in a computer readable storage device that corresponds to a function that can be decomposed into reactive values and executed on a computing system and a process to update the structure in response to changes in one or more reactive values (FIG. 3B) in accordance with some embodiments.
Figure 3B:
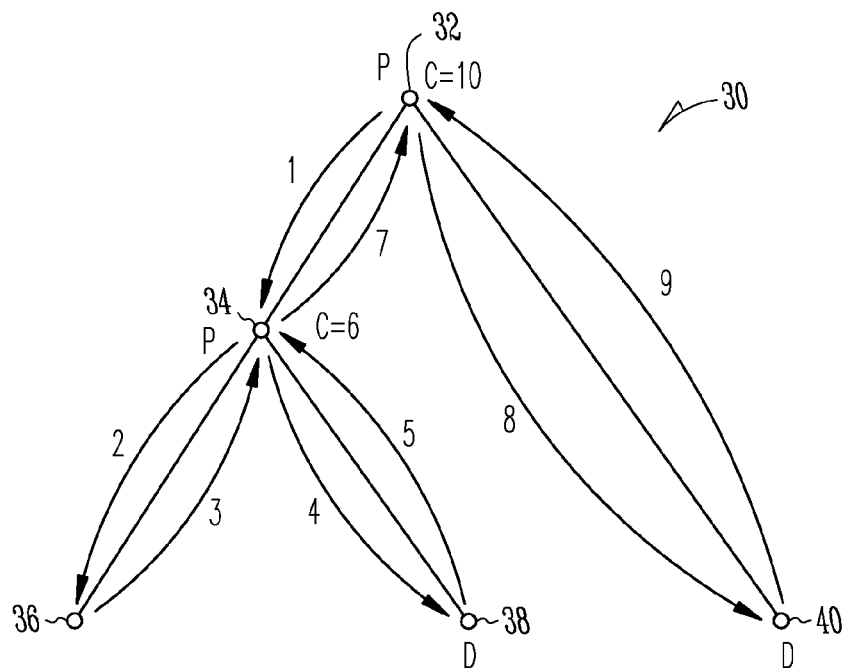

FIGS. 3A-3B are illustrative drawings of a first reactive value hierarchy structure (FIG. 3A) encoded in a computer readable storage device that corresponds to a function. that can be decomposed into reactive values and executed on a computing system and a process to update the structure in response to changes in one or more reactive values (FIG. 3B) in accordance with some embodiments. In accordance with some embodiments the hierarchy is a directed acyclic graph (DAG) structure. Significantly, reactive values can have more than one dependent values, which is permitted in a DAG structure.

Referring to FIG. 3A, a first example function, F=(A*B)+C, can be decomposed into reactive values, A, B, (A*B) and C, which are listed herein in order of their input to and use in the function. The first reactive value hierarchy structure 30 represents hierarchical dependency and input order relationships among nodes and corresponding reactive values used in the first function. For example, reactive value (A*B) which corresponds to node 34 is dependent upon reactive values A and B which correspond to nodes 36 and 38, and conversely, reactive values A and B which correspond to nodes 36 and 38 are inputs to node 34 which corresponds to reactive value (A*B).

The first reactive value hierarchy structure 30 also represents order of input to and use of reactive values within the first function. Relative positioning of node 36 which corresponds to value A to the left of node 38 which corresponds to value B and relative positioning of node B to the left of node C indicates an ordering of nodes 36, 38 and 40 that corresponds to the ordering of reactive values A, B and C in the first function. Likewise, ordering of node 32 which corresponds to (A*B) to the left of node 40 indicates an ordering of nodes 32 and 40 that corresponds to the ordering of reactive values (A*B) and C in the first function.

Referring to FIG. 3B, there are shown example path traversals used to update the first hierarchy structure 30 in response to changes in reactive values. In this example, assume that reactive values B and C have changed. Corresponding nodes 38 and 40 are marked as 'dirty' (D) since the input values corresponding to nodes 38 and 40 have changed. Moreover, nodes 34 and 32 are marked as 'possibly dirty' (P) since they correspond to reactive values that depend upon nodes that have changed and have been marked as dirty.

A traversal downward from root node 32 starts with path (1) from node 32 to node 34. Since node 34 is possibly dirty, traversal downward continues on path (2) to node 32, which is not dirty and therefore clean. Traversal proceeds back upward on path (3) to node 34, which is the dependent node of node 36 from which the downward traversal to node 36 proceeded. Since node 34 remains possibly dirty, traversal proceeds downward to the next in order node 38 on path (4). Node 34 is dirty and traversal proceeds back up to node 34 on path (5). Since input node 38 of node 34 was found to be dirty, a compute (indicated by C=6) of the reactive value corresponding to node 34 takes place. As a result of the compute, bode 34 is no longer possibly dirty. Assume for this example that node 34 computes to a value no different from its prior value and is determined to be not changed, and therefore, clean. Traversal upwards through the hierarchy then proceeds on path (7) from node 34 to node 32. Next, since node 32 is possibly dirty, traversal proceeds to the next in order input node 40 on path (8). Node 40 is dirty, and traversal proceeds on path (9) back upward to node 32 where a new reactive value corresponding to node 32 is computed (indicated by C=10)

It will be appreciated that the description of FIGS. 3A-3B is general in nature and is provided by way of overview. Additional details of embodiments are provided below.

Figure 4A:
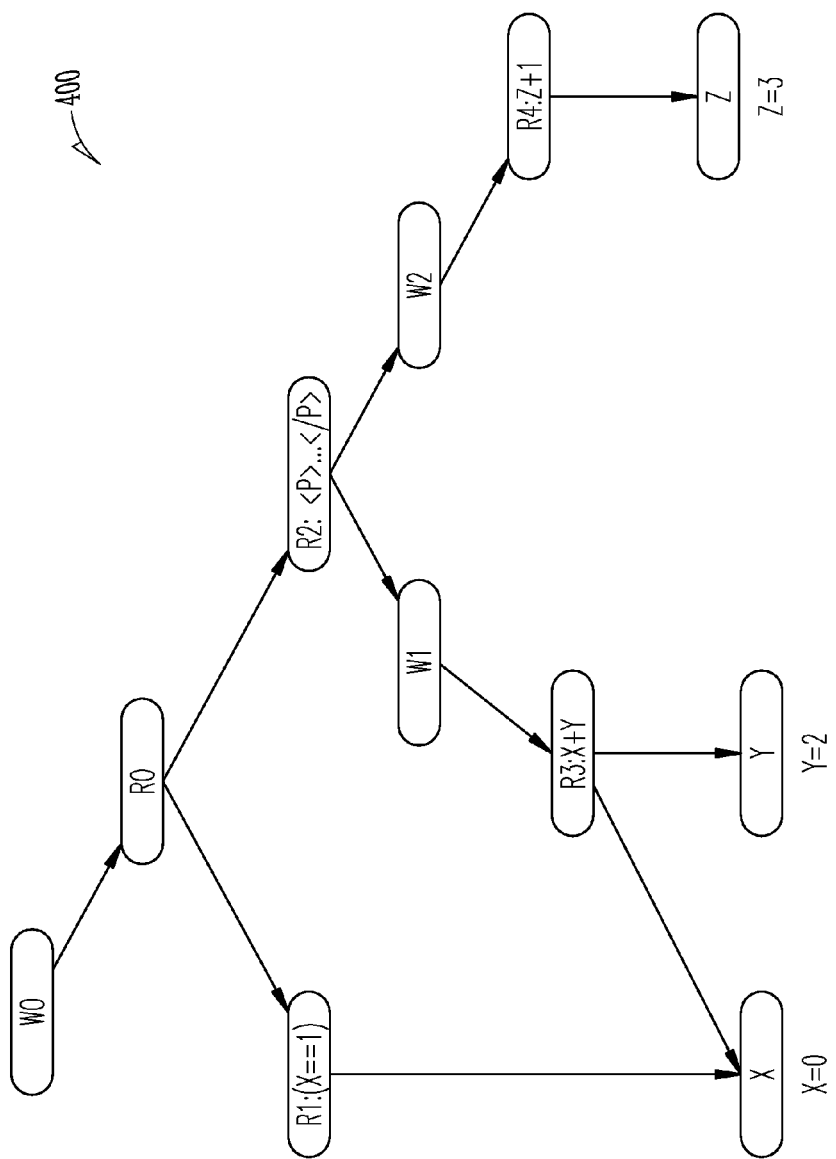
FIG. 4A is an illustrative drawing of a second reactive value hierarchy structure in accordance with some embodiments.

FIG. 4A is an illustrative drawing of a second reactive value hierarchy structure 400 in accordance with some embodiments. Table 1 shows a second example function in computer program pseudo-code form, containing reactive values that correspond to the nodes of the reactive value hierarchy structure of FIG. 4A. The reactive value hierarchy structure indicates hierarchy relationships among nodes that represent hierarchy relationships among reactive values of the example function. For instance, according to the function and the hierarchy structure, the reactive value (X+Y) that corresponds to node R3 depends upon reactive value X that corresponds to node X and depends upon reactive value Y that corresponds to node Y.

TABLE 1 f( ){
if(x==1)
return <p> (X+Y), (Z+1) <p>;
else
return (N+1);
}

The illustrative second reactive value hierarchy structure 400 of FIG. 4A is produced in the course of execution of the example function of Table 1. More specifically, a processor is configured to execute the example function of Table 1 a first time with mutable value assignments to be X=1; Y=2; Z=3. No value is computed for (N−1) since that reactive value is not in use in the first pass. The processor is further configured to produce the reactive value hierarchy structure in the course of the use of the reactive values during execution of the function to represent relationships among the reactive values during execution of the function.

In this illustrative example, the second function has been parsed into reactive values X, Y, Z, N, (X==1), (X+Y), (Z+1.) and (N+1). Reactive values X, Y, Z and N are mutable reactive values. It will be appreciated that the granularity of parsing of a function into reactive values is a matter of design choice and may be accomplished automatically at compile time or may be accomplished at runtime either automatically or manually. As shown in FIG. 4A, mutable values X, Y and Z of the function, respectively, correspond to nodes X, Y and Z of the reactive value hierarchy structure. Reactive value (X==1) of the function corresponds to node R1 of the reactive value hierarchy structure. Reactive value (X+Y) of the function corresponds to node R3 of the reactive value hierarchy structure. Reactive value (Z+1) of the function corresponds to node R4 of the reactive value hierarchy structure. A reactive value corresponding to node R0 acts to observe whether reactive value R1 (X==1) is TRUE or FALSE, and if TRUE, then the reactive value corresponding to R0 returns the reactive value (corresponding to node R2 and if FALSE returns the reactive value (N+1). In this example, the reactive value (X==1) returns TRUE.

Referring again to FIG. 4A, the hierarchy structure is encoded in computer readable storage device. The hierarchy structure defines DAG relationships among reactive values. The hierarchy structure includes a root node R0. Node R0 is associated directly in the hierarchy structure with node R1 and node R2, since no other nodes intervene between node R0 and R1 or between node R0 and node R2.

Node R0 is associated directly with node W0, a watch node, which is a dependent node of node R0. Conversely, node R0 is an input node to node W1.

Node R1 is associated with node R0 as an input node to node R0, and node R0 is associated with node R1 as a dependent node of node R1. Similarly, node R2 is associated with node R0 as an input node to node R0, and node R0 is associated with node R2 as a dependent node of node R2. Node R1 is directly associated with node X, which corresponds to a mutable value X. Node X is associated with node R1 as an input node to node R1. node R1 is associated with node X as a dependent node of node X. Accordingly, as used herein, the term reactive value encompasses mutable values.

Node R2 is associated directly in the hierarchy structure with node W1 and node W2, since no other nodes intervene between node R2 and node W1 or between node R2 and node W2. Nodes W1 and W2 are watch nodes, which are explained more fully below, that cause side-effects in response to reactive value changes. Node W1 is associated with node R2 as an input node to node R2, and node R2 is associated with node W1 as a dependent node of node W1. Similarly, node W2 is associated with node R2 as an input to node R2, and node R2 is associated with node W2 as a dependent node of node W2.

Node W1 is associated directly in the hierarchy structure with node R3, since no other nodes intervene between node W1 and node R3. Node R3 is associated with node W1 as an input node to node W1, and node W1 is associated with node R3 as a dependent node of node R3.

Node W2 is associated directly in the hierarchy structure with node R4, since no other nodes intervene between node W2 and node R4. Node R4 is associated with node W2 as an input node to node W2, and node W2 is associated with node R4 as a dependent node of node R4.

Node R3 is directly associated with node Y, which corresponds to a mutable value Y. Node Y is associated with node R3 as an input node to node R3, and node R3 is associated with node Y as a dependent node of node Y. Node R3 also is directly associated with node X, which corresponds to a mutable value X. Node X is associated with node R3 as an input node to node R3, and node R3 is associated with node X as a dependent node of node X.

Node R4 is directly associated with node Z, which corresponds to a mutable value Z. Node Z is associated with node R4 as an input node to node R4, and node R4 is associated with node Z as a dependent node of node Z.

As used herein, the term 'mutable value' signifies a subtype of a reactive value that changes because it is given a new value. A reactive value has the property that it can change and also has the property that it has a dependency relationship with another value such that the reactive value changes in response to a change in other value. A mutable value also can change, but not in response to another value. In the method and system described herein no distinction is made between a value that changes in reaction to a change in another value and a value that changes because it is given a new value. So for the purposes of the system and method described herein, a mutable value is a subtype of a reactive value type.

Figure 4B:
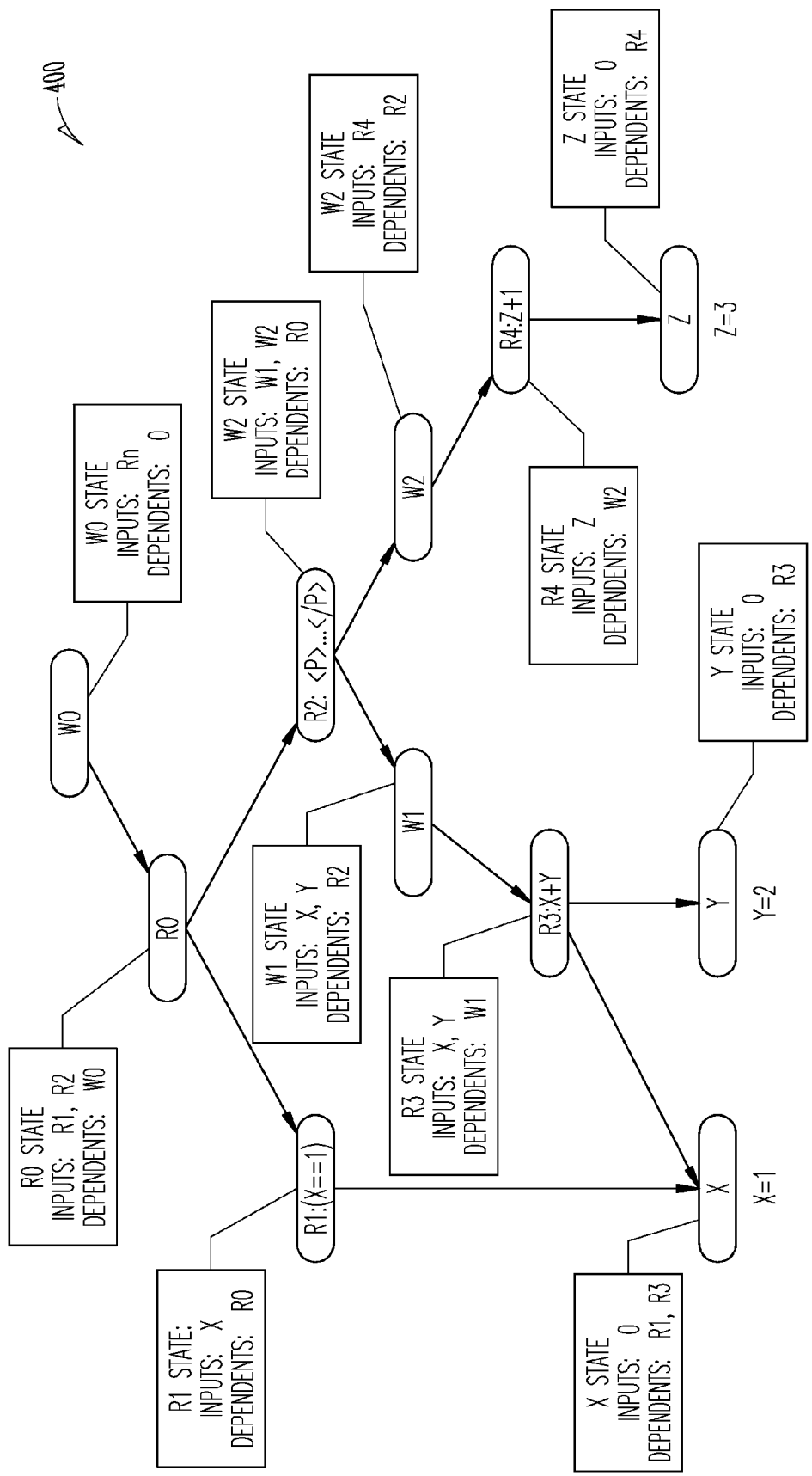
FIG. 4B is an illustrative drawing of the second reactive value hierarchy structure of FIG. 4A annotated to show connectivity state information structures used to implement nodes of the hierarchy structure in accordance with some embodiments.

FIG. 4B is an illustrative drawing of the reactive value hierarchy structure 400 of FIG. 4A annotated to show connectivity state information structures used to implement nodes of the hierarchy structure in accordance with some embodiments. The connectivity state information structures are encoded in computer readable storage device. Each node of the hierarchy 400 comprises a connectivity state information structure that indicates input node relationships and dependent node relationships with nodes that it is directly associated with. Collectively, the nodes' connectivity state information structures define the structure of the reactive value hierarchy structure. For example, an R0 connectivity state information structure indicates that node R0 is associated with nodes R1 and R2 as input nodes to node R0 and has the null set as nodes associated with R0 as dependent nodes of R0. Also, for example, an R3 connectivity state information structure indicates that node R3 is associated with nodes X and Y as input nodes to node R3 and is associated with node R2 as a dependent node of R3.

The reactive value hierarchy structure 400 also indicates precedence order of operations of the example function. In the example reactive value hierarchy structure of FIG. 4A, nodes are shown ordered left-to-right to match the order in which their corresponding reactive values are used during execution of the example function. For example, the first reactive value used in the execution of function is reactive value X corresponding to node X, and the first reactive value computed is (X==1) corresponding to node R1. Accordingly, node X and R0 are ordered to the left of the other nodes in the graphs. This ordering is indicated in the connectivity state information structures of FIG. 4B, which indicate ordered sets of one or more input nodes. The ordering of the inputs corresponds to the order in which reactive values corresponding to the inputs are used in the course of execution of the function. Referring to the R0 connectivity state information structure, the inputs are ordered first R1 and then R2 because R1 is used by the function before R2 is used. For example, referring to the R3 connectivity state information structure, the inputs are ordered first X and then Y because X is used by the function before Y is used.

The ordering of nodes according to order of reactive value use by the function is significant. A function may contain a conditional or branch such that the reactive values used in one part of the function may depend upon the reactive values computed in another part of the function. Thus, conditional or branch decisions by the function may influence the validity of portions of the reactive value hierarchy structure in subsequent executions of the function in which a different conditional or branch decisions are a possibility. More specifically, conditional or branch decisions may influence the validity of connectivity state information such as that shown in FIG. 4B.

Continuing with the example of the first time execution of the function of Table 1, mutable value X=1. Therefore, reactive value (X==1) is TRUE, and the function branches to 'return <p>(X+Y), (Z+1)<p>'. Thus, there is no use of reactive value (N+1) during the first run of the example function. This branch by the function, which is dependent upon the value of mutable value X is captured in the connectivity state information of FIG. 4B, which includes connectivity state information that correspond to reactive values Y, Z, (X+Y) and (Z+1), but that does not include nodes that correspond to reactive values N or (N+1).

Still continuing with the example, assume that following construction of the reactive value hierarchy structure of FIG. 4A, the mutable value assignments change to X=0; Y=2; Z=3; and N=1. This change in reactive/mutable values is detected by an API (Application Programming Interface) that records each changed mutable value, marks the values as dirty and propagates the changes to the graph 400. Thus, in response to the change in reactive values, change state information is produced for nodes within the hierarchy.

Figure 4C:
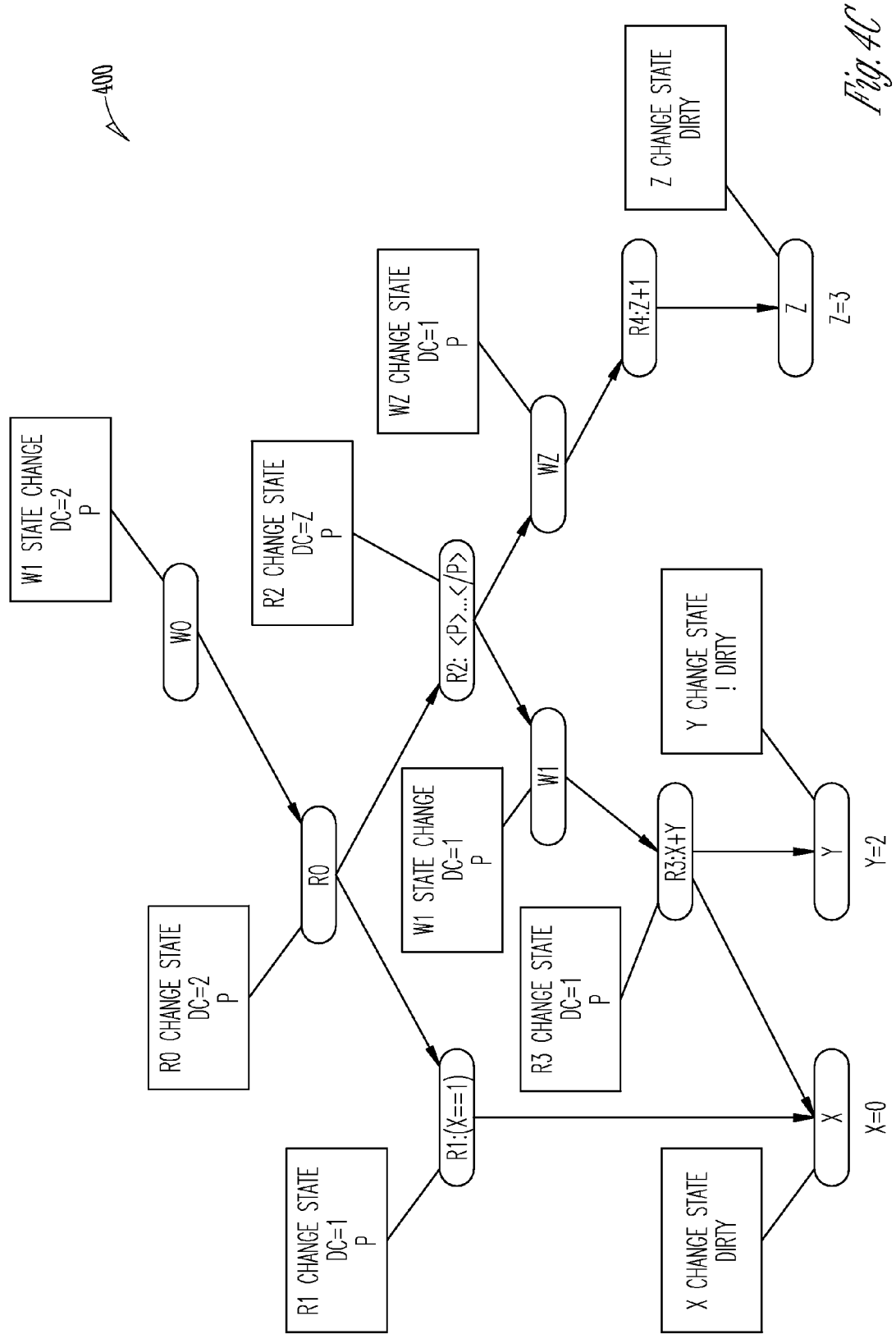
FIG. 4C is an illustrative drawing of the second reactive value hierarchy structure of FIG. 4A annotated to show change state information structures containing change state information produced in response detection of one or more changed reactive values in accordance with some embodiments.

FIG. 4C is an illustrative drawing of the reactive value hierarchy structure 400 of FIG. 4A marked with information in associated data structures to show change state information structures containing change state information produced in response detection of one or more changed reactive values in accordance with some embodiments. The change state information structures are encoded in a computer readable storage device and are associated with nodes in the hierarchy.

The change state information structures include a first change indication of whether a reactive value corresponding to an associated node is 'dirty'. An indication that a node is 'dirty' signifies that the corresponding reactive value must be computed. A node is dirty if a reactive value of one of its input nodes changes. Such a change may result from a change in a mutable value associated with an input node, for example. Such a change also may result when a new value is computed for a reactive value of an input node to a node, and the new value is different from a previous value associated with the input node. However, an indication that marks an associated node as not dirty (i.e. '!dirty') leaves open the possibility that the associated node may become dirty. The first change indication (i.e., the dirty state) of a node may change in the course of exploration of the hierarchy to determine which reactive values need to be computed and which do not. When a dirty state of a node becomes 'dirty', then the reactive value associated with that node needs to be computed before its value can be used by another node in the hierarchy. However, if a reactive value associated with a node is no longer used in the course of a function to which the hierarchy corresponds, due to a conditional branch for example, then the reactive value need not be computed for that dirty node. As explained below, computation of an updated value for a dirty node may result in arrival at the same value that the reactive value had previously or in arrival at a new changed reactive value. The change state information structure also includes a second change indication to indicate whether changes to reactive values corresponding to other nodes upon which an associated node depends may require a computation of the reactive value corresponding to that associated node. In some embodiments, the second change indication comprises a count referred to as a 'dirty count', which is a count of the number of direct inputs to a given node that are possibly dirty. The dirty count, is useful to avoid unnecessary traversal effort in determining which nodes, if any, require a compute. The dirty count of a node is adjusted in the course of exploration of the hierarchy to determine which reactive values need to be computed and which do not. When a dirty count associated with a node is adjusted so as to become '0' then traversal down through the hierarchy from that node in search of dirty nodes can stop.

Figure 5:
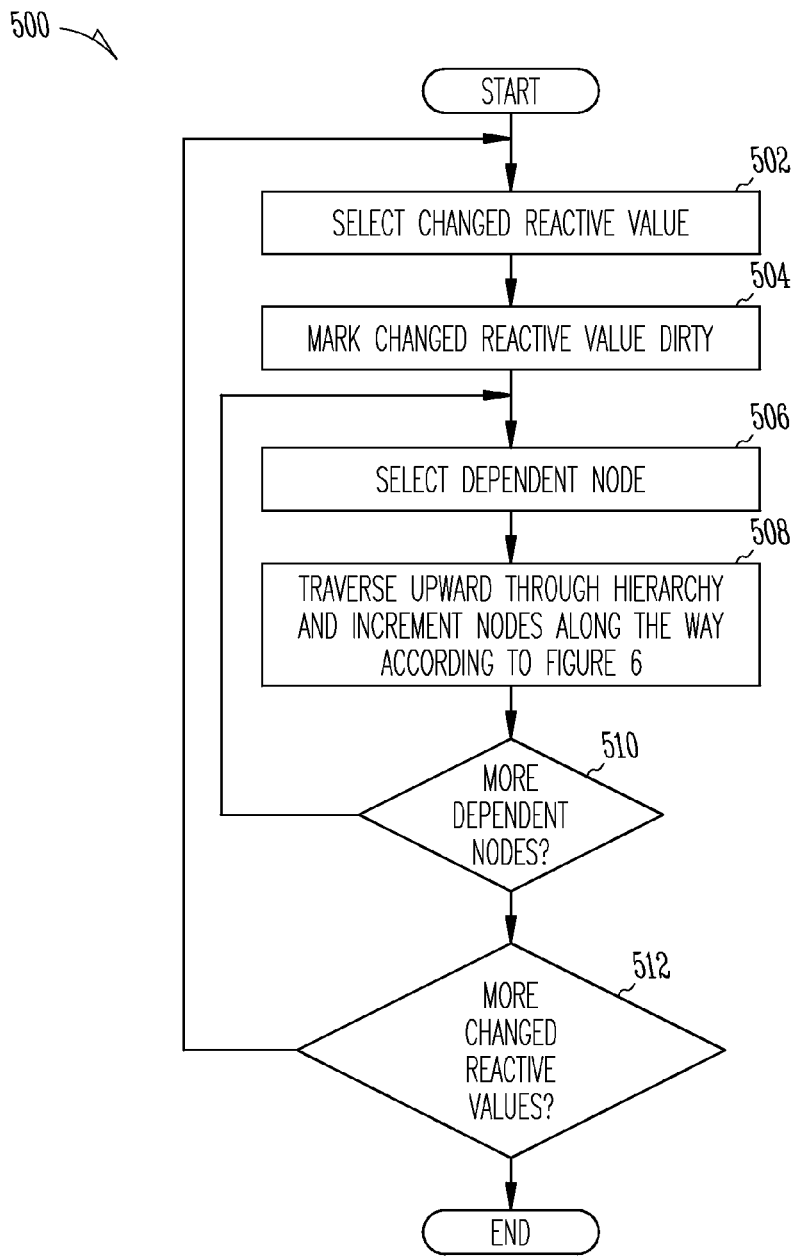
FIG. 5 is an illustrative flow diagram of a traversal and change state traversal process to traverse the reactive value hierarchy structure of FIG. 4A in accordance with some embodiments.
Figure 6:
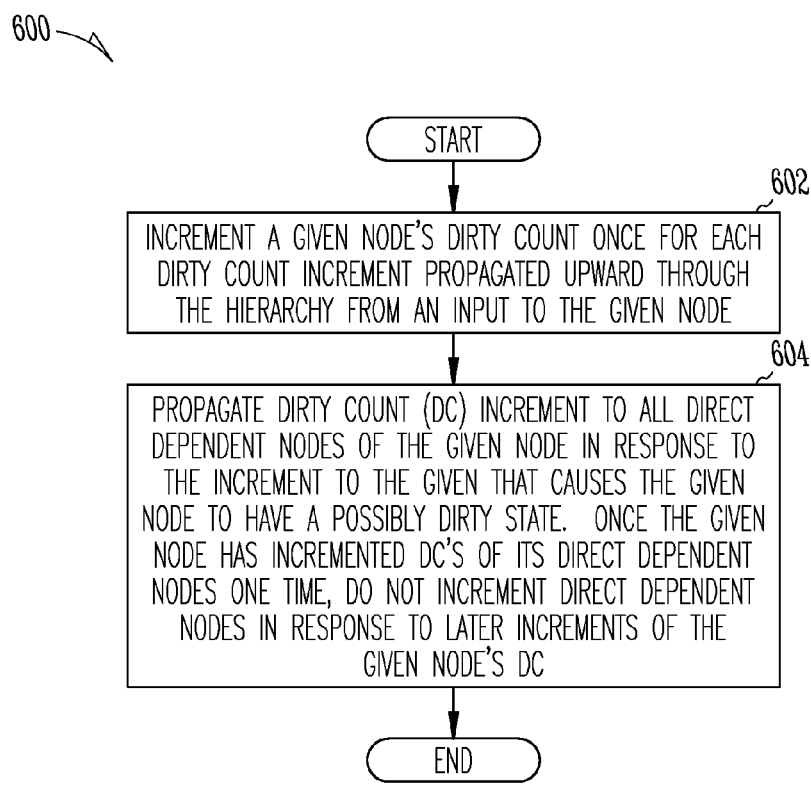
FIG. 6 is an illustrative flow diagram of a second change state determination process that runs in conjunction with the change state traversal process of FIG. 5.

FIG. 5 is an illustrative flow diagram of a traversal and change state traversal process 500 to traverse the reactive value hierarchy structure 400 of FIG. 4A in accordance with some embodiments. FIG. 6 is an illustrative flow diagram of a second change state determination process 600 that runs in conjunction with the change state traversal process 500. In some embodiments, the second change state determination process 600 adjusts dirty count for individual nodes of the hierarchy. The processes are implemented with computer program code, and each module of the flow diagrams represents configuration of a processor to implement the act specified for the module.

Referring to FIG. 5, module 502 selects a changed reactive value. Module 504 sets the first change state information to dirty for the selected changed reactive value to indicate that the reactive value has changed. Module 506 selects a dependent node of the changed reactive value that has not yet had state change information adjusted in view of the currently selected changed reactive value. Module 508 traverses upward through the hierarchy from the currently selected dependent node based upon connectivity state information, such as that in FIG. 4B, and increments second change state information, such as the dirty count information, associated with nodes along the way according to the second change state determination process 600 of FIG. 6. Upon completion of a traversal to the highest node in the hierarchy that corresponds to a reactive value that is transitively dependent upon the currently selected changed reactive value, decision module 510 determines whether there is an additional node that is directly dependent upon the selected changed reactive value and that has not yet had state change information adjusted in view of the currently selected changed reactive value. If yes, then control returns to module 506 and that other dependent node is selected, and modules 508 traverses from that next selected directly dependent node. If no, then control flows to decision module 512, which determines whether there is another changed value that has not been selected in module 502. If yes, then control flows to module 502 and another changed value is selected. If no, then the process 500 ends.

Referring to FIG. 6, module 602 adjusts a given node's second change information. In some embodiments, the given node's second change information comprises a count, and the adjustment involves incrementing the count referred to as the dirty count. The second change information for a given node may be dependent, transitively or directly, upon one or more changed reactive values lower in the hierarchy. As explained with reference to FIG. 5, the second change information for each different changed reactive value that reactive value corresponding to the given node is dependent upon is propagated to the given node by a different input node for which the given node is a dependent node. Thus, for example, if the given node is dependent, either transitively or directly, upon two changed reactive values, then the dirty count for the reactive node is incremented by two.

Module 604 propagates second changed information from the given node to each node that corresponds to a reactive value that is directly dependent upon the reactive value that corresponds to the given node. More particularly, when the dirty count associated with a given node previously had second change information indicating that the given node was previously clean, e.g., a dirty count of zero (0), and the second change information for the given node changes, e.g., the dirty count increments from zero (0) to one (1), to indicate that the given node has become possibly dirty, module 604 increments the dirty count of each node that is directly dependent upon that given node. More particularly, in response to a given node corresponding to a reactive value either (i) becoming dirty when it was not previously dirty or (ii) having a dirty count, DC>0, when it's dirty count was not previously a dirty count DC>0, module 604 causes the dirty count of each node that is a direct dependent of that node is incremented. Subsequent incrementing of the dirty count of that given node does not result in module 604 causing additional incrementing of dirty counts of direct dependents to that given node.

The term 'given node' as used herein is shorthand for an arbitrary node within the hierarchy. In general, the descriptions of behavior relative to a given node is applicable to other similarly situated nodes within the hierarchy.

Continuing again with the example, the processes 500, 600 of FIGS. 5-6 are explained with reference to FIGS. 4B-4C. Module 502 selects changed reactive value X that corresponds to node X. Module 504 marks the first state information associated with node X as 'dirty' as shown in FIG. 4C. Marking the node X as dirty ensures that dependent nodes of node X need to compute new reactive values. Module 506 selects dependent node R1 and causes traversal up through the hierarchy to node R0. Module 508 uses the connectivity information shown in FIG. 4B to find the traversal path from node X to node R1 to node R0. In the course of the traversal, the process 600 of FIG. 6 causes incrementing by one of second change information, the dirty count, of both nodes R1 and R0. Decision module 510 determines that node X has another dependent node, and module 506 selects node R3. Module 508 uses the connectivity information shown in FIG. 4B to find the traversal path from node X to node R3 and to node W1 and to node R0. In the course of the traversal, the process 600 of FIG. 6 causes incrementing by one of second change information, the dirty counts, of nodes R3, W1, R2 and R0. Decision module 510 determines that there are no more dependent nodes of node X.

Module 502 selects changed reactive value Z that corresponds to node Z. Module 504 marks the first state information associated with node Z as 'dirty'. Marking the node Z as dirty ensures that dependent nodes of node Z need to compute new reactive values. Module 506 selects dependent node R4 and causes traversal up through the hierarchy to node W2, to node R2 and to node R0. Module 508 uses the connectivity information shown in FIG. 4B to find the traversal path from node X to node R3 and to node W1 and to node R0. In the course of the traversal, the process 600 of FIG. 6 causes incrementing by one of second change information, the dirty counts, of nodes R4, W2 and R2. Note that the dirty count of R0, which is '2' as shown in FIG. 4C, is not incremented due to this traversal from node Z since module 604 previously propagated a dirty count increment from node R2 to R0. Decision module 510 determines that there are no more dependent nodes to node Z. Decision module 512 determines that there are no more changed reactive values. The traversal process 500 ends.

It will be noted that the change state structures in FIG. 4C that have dirty count (DC)>1 are marked with "P", which stands for 'possibly dirty' state. A possibly dirty state is inferred for a node that had not been marked as 'dirty', but that has DC>0. A node is 'clean' if it is '!dirty' (i.e. not dirty) and its associated DC=0.

After change state has been determined according to processes 500 and 600, the function is executed a second time, but with the aid of the reactive value hierarchy structure annotated with change state information such as that shown in the example drawing of FIG. 4B. In the course of the second execution of the function, the hierarchy is traversed to determine which reactive values need to be recomputed in response to the changed reactive values. New values are computed only for those reactive values provided for in the hierarchy that require computation according to the traversal. As explained more fully below, if the second execution of the function branches to an execution path different from that used during the first execution of the function, then values for reactive values on that different execution path that are not included within the hierarchy may have to be computed. Moreover, if the function branches to a different execution path the second time, then some reactive values within the hierarchy may become obsolete.

Figure 7A:
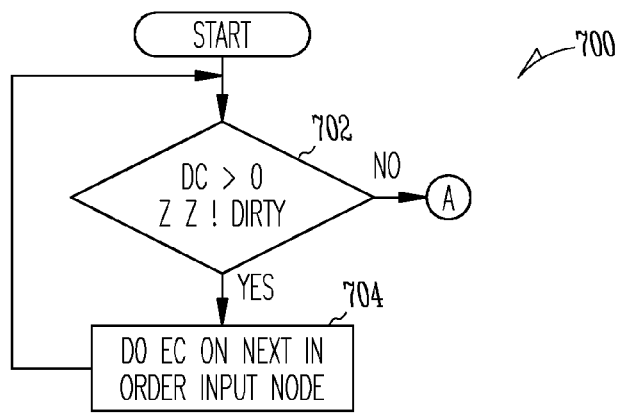
FIGS. 7A-7C are illustrative drawings of three aspects of a recursive process in accordance with some embodiments to traverse the hierarchy to ensure that reactive values are current by identifying reactive values that need to he computed and by computing new values for the identified reactive values.
Figure 7B:
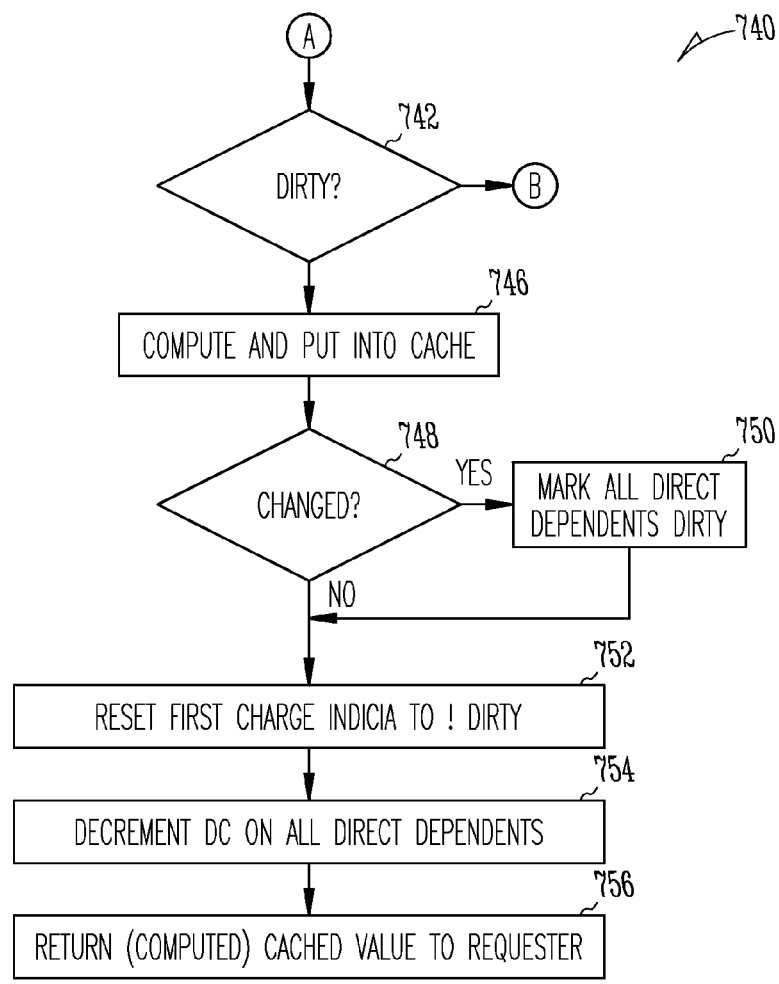
Figure 7C:
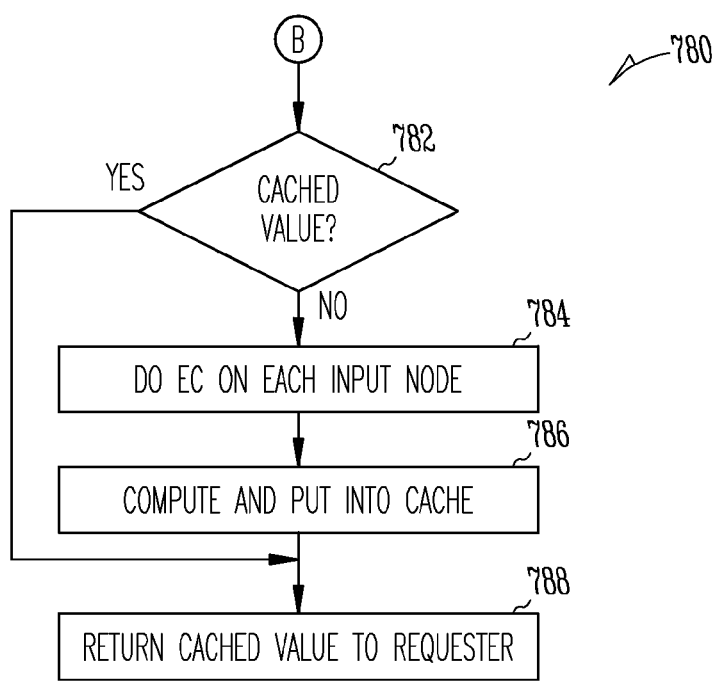

FIGS. 7A-7C are illustrative drawings of three aspects of a recursive process in accordance with some embodiments to traverse the hierarchy to ensure that reactive values are current by identifying reactive values that need to be computed and by computing new values for the identified reactive values. FIG. 7A is an illustrative flow diagram representing a first process 700 to investigate possibly nodes directly input nodes to a given node to determine whether any of them is dirty. FIG. 7B is an illustrative flow diagram representing a second process 740 to compute a reactive value for a node when it is determined to be dirty and to adjust change state information of nodes dependent upon the given node. FIG. 7C is an illustrative flow diagram representing a third process 780 to return a reactive value of a given node to a dependent node. The processes are implemented with computer program code, and each module of the flow diagrams represents configuration of a processor to implement the act specified for the module.

Referring to FIG. 7A, decision module 702 monitors dirty count (DC) and dirty status for a given node. While DC>0 and dirty status is not dirty (?dirty), module 704 requests the performance of the recursive process (FIGS. 7A-7C) on each input node in order to the given node. The given node gets a return value from each input node that completes the recursive process. It will be appreciated that the while the given node is possibly dirty, the first process 700 traverses downward through the hierarchy to its direct input nodes. One or more of those direct input nodes, in turn, may traverse down to its direct input node. This downward traversal continues until a node that is marked dirty is encountered whereupon the second process 740 runs. If the decision module 702, determines that for the given node the condition [DC>0 && !dirty] is not true, then the checking of input nodes by module 704 stops and control flows to the second process 740

Referring to FIG. 7B, decision module 742 determines whether the given node's dirty state indicates that the given node is dirty. If yes, then module 746 computes an updated value for the reactive value and stores it in cache associated with the given node. In computing an updated value for a reactive value, module 746 calls the function for that reactive value. If that called function, in turn, calls for other reactive values. The module 746 calls such reactive values in the order in which they are to be computed. The module 746 runs the recursive function 700 on each called reactive value.

For example, assume that module 746 is to compute an updated value for node R3. Pursuant to the second example function, module 746 first gets the value for X. Getting the value for X involves running the recursive process 700 on node X. Second, according to the second example function, module 746 gets the value for Y. Getting the value for Y involves running the recursive process 700 on node Y. Next, the module 746 computes (X+Y) using the updated values that have been obtained. Note that the module 746 obtained the updated reactive values for nodes X and V in the order in which the second example function uses the respective values: first, X, and second, Y.

Once a newly computed value has been determined, decision module 748 determines whether the newly computed value for the reactive value is changed from a previously computed previously cached value for the reactive value. If yes, then module 750 marks all direct dependents of the given module as 'dirty'. In other words, module 750 adjusts the change state information associated with dependent nodes of the given node from not dirty to dirty. Note that if a dependent node already is marked 'dirty', then no change is required to mark that node dirty. Next, module 752 resets the dirty state of the given node to not dirty (!dirty). Module 754 decrements the dirty count of all direct dependents of the given node. If after decrementing a direct dependent node's dirty count or changing its dirty state to FALSE, the DC state of that node is zero (0) and the node is marked as not dirty then the dirty count on all dependent nodes to that node must be decremented. This evaluation is repeated at each dependent node and at each level of dependent nodes. Thus, there can be a ripple effect in the propagation of 'no longer possibly dirty' state information up through the hierarchy 400. Module 756 returns the cached value to the dependent node of the given node that requested that the first process 700 run on the given node.

It will be appreciated that the first process 700 causes a systematic traversal downward through the hierarchy from a given possibly dirty node in search of a changed reactive value, but once a changed reactive value is located (i.e., a dirty reactive value is located) in the course of the downward traversal, an updated value for that changed reactive value is computed and dirty counts of all direct dependents are updated, using the second process 740, which causes the traversal to move back up a level to the given node. More specifically, module 704's causing the first process 700 to address each of the input nodes, in order one after another, lower in the hierarchy effects a systematic downward traversal that ultimately is interrupted by the running of the second process 740 to address the changed reactive value of some node lower in the hierarchy. Thus, overall, the search process is thorough but is cut short when meaningful information, i.e. a dirty node, is identified.

It also will be appreciated that the second process 740 averts propagating dirty status upward through the hierarchy if a changed reactive value lower in the hierarchy does not result in a change in a related reactive value higher in the hierarchy. Specifically, module 750 marks dependent nodes as dirty only if the computed reactive value for the given node is changed from a previously cached reactive value for the given node. Thus, if a reactive value change occurring lower in the hierarchy that resulted in the given node's being marked as 'dirty' does not actually result in a change in the reactive value of the given node, then the given node does not percolate the dirty status upward in the hierarchy and the affect of the changed reactive value lower in the hierarchy fizzles out at the level of the given node.

Moreover, if a change simultaneously causes a node associated with a first reactive value to become dirty and also causes a second reactive value to stop depending upon the first reactive value, then a new reactive value for the first reactive value will not be computed. More particularly, the process starts at the root rvalue and traverses a DAG looking for dirty rvalues. As rvalues are recomputed their inputs may change. An rvalue is recomputed only after it is known that the rvalue will still be in use after the change has been fully propagated. This ensures that rvalues will not be recomputed only to later become unused in the same propagation.

Referring to FIG. 7B, if decision module 742 determines that the given node is not dirty, then control flows to the third process 780.

Referring to FIG. 7C, decision module 782 determines whether a previous reactive value was cached for the given node. If not, then module 784 calls for the first process 100 to run on each input node to the given node. It will be appreciated that since the given node is not marked dirty, none of the input nodes to the given node contain changed reactive values, and each such input node should revert to the same third process 780 and return values to the given node. Module 786 uses the values returned due to module 784 to compute a reactive value for the given node and to store it in cache. Module 788 returns the reactive value to the node that requested that the first process 100 be run on the given node. If decision module 782 determines that the given node has a previously cached value already, then control flows to module 788, which returns the reactive value to the node that requested that the first process 100 be run on the given node.

Continuing with the above example and referring to FIGS. 4B-4C, the recursive process of FIGS. 7A-7C begins with an instance of the recursive process running on the root node R0. It will be appreciated that 'running on the root node' means running and processing data associated with the root node R0. Referring to FIG. 4C, the change state data for the root node R0 shows that R0 is possibly dirty (P) since DC>0. Specifically, DC=2 for node R0. Therefore, an instance of process 700 runs on R0. FIG. 4B includes R0 state information associated with R0 that shows the ordering of input nodes R1 and R2 to R0. Pursuant to decision module 702 and module 704, the process 100 running on the root node R0 requests that the recursive process run on node R1, which is the first in order input node to R0, and waits for a return from R1.

Next, an instance of the recursive process runs on node R1, and the instance of recursive process running on node R0 waits for a return from R1. Referring to FIG. 4C, the change state data for node R1 shows that R1 is possibly dirty (P) since DC=12 and the dirty state is set to not dirty. Therefore, pursuant to decision module 702 and module 704, the process 100 running on node R1 requests that the recursive process run on node X, which is the only input node to R0, and waits for a return from node X.

The recursive process runs on node X, and the instance of the recursive process running on node R1 waits for a return from node X. Referring to FIG. 4C, the change state data for node X shows that X is dirty Therefore, process 740 runs. Since X corresponds to a mutable value no actual computation is required, and the changed value of X is put into cache pursuant to module X. Since the value of X changed (from X=1 in FIG. 4B to X=1 in FIG. 4C) module 750 causes the dirty states of both nodes R1 and R3, which are direct dependent nodes of node X to become 'dirty'. Pursuant to module 752, the dirty state of node X is set to not dirty; pursuant to module 754, the dirty counts of each of nodes R1 and R3 the direct dependent nodes of node X are decremented by 1. The newly cached value of node X is returned to the waiting recursive process running on node R1 pursuant to module 756.

Module 704 of the instance of the recursive process running on R1 asks for X's value. Since X is now clean, module 704 returns the cached value of X to node R1.

The instance of the recursive process running on R1 receives the returned changed value of X. Since the value associated with R1 has changed, module 750 sets the dirty state of R0 to dirty; module 752 sets the dirty state of R1 to not dirty; module 754 decrements the dirty count of R0 by 1 (to DC=1); and module 756 returns the new value (a branch decision in this case) to R0.

The instance of the process running on node R0 receives the returned value and notes that the R0 change state information now indicates that R0 is dirty. Pursuant to module 746, the process running on R0 requests that the recursive process run on node R1 After receiving a return from node R1, and pursuant to module 744, the process running on R0 requests that the recursive process run on node R2.

Note that in this second time running the function, the branch decision branches to a different execution path. This time, since X=0, the conditional statement (X==1) results in a branch to reactive value (N=1).

Figure 8:
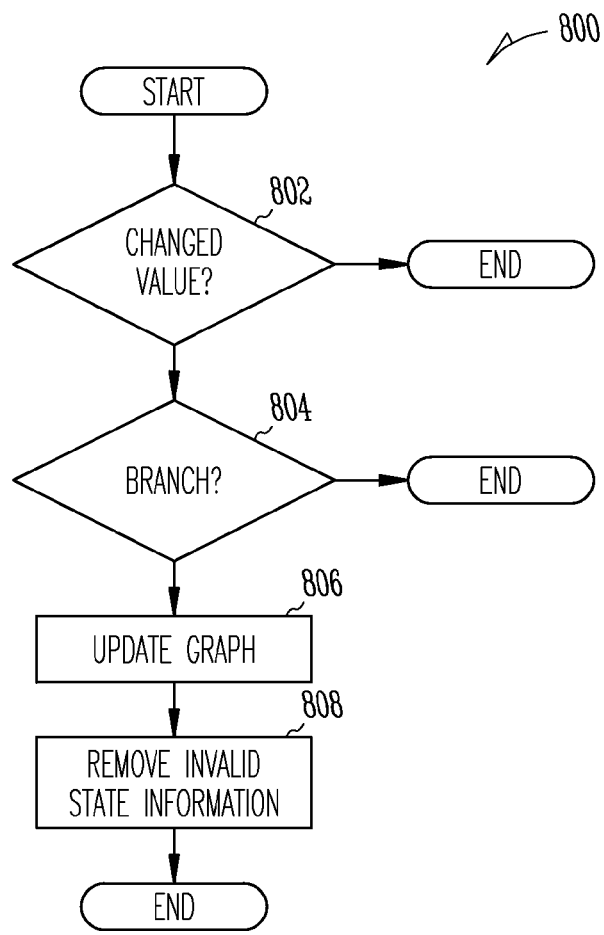
FIG. 8 is an illustrative flow diagram representing a process to update the reactive value hierarchy structure and to remove invalid state information in the event that the function uses a different branch during different runs.

FIG. 8 is an illustrative flow diagram representing a process 800 to update the reactive value hierarchy structure and to remove invalid state information in the event that the function uses a different branch during different runs. The process 800 runs in the course of the running of the recursive process (FIGS. 7A-7C). For each given node visited (i.e. on which the recursive process runs), module 802 determines whether the node has a changed reactive value. Referring to FIG. 7B, module 748 may serve as a source of changed value information. If no, the process ends for that node. If yes, then decision module 804 determines whether the node is a branch node. If no, then the process ends for that node. If yes, then module 806 updates the hierarchy graph to add reactive values for the new branch and to remove from the hierarchy reactive values that were used in the previous branch but that are not used in the current branch. Module 808 removes change state information used during graph traversal that is invalid in view of the modifications to the hierarchy graph due to the new branch.

Figure 9:
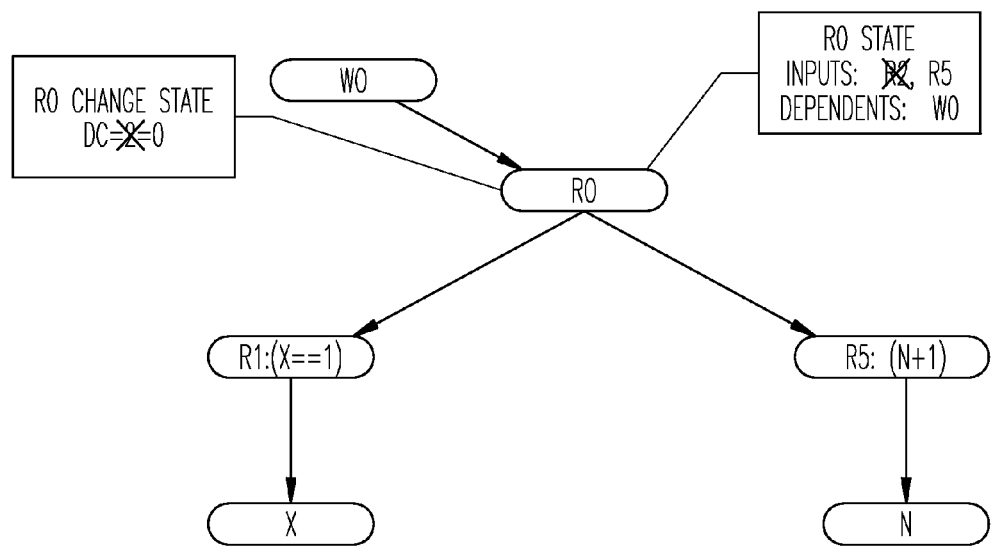
FIG. 9 is an illustrative drawing of the second reactive value hierarchy structure of FIG. 4A modified to represent relationships among reactive values on a different execution path in accordance with some embodiments.

Continuing again with the example, and referring to FIG. 4A and to FIG. 9, and to FIG. 7B, assume that module 746 is to compute an updated reactive value for node R1. According to the second example function, module 746 gets a reactive value for node X. Getting a reactive value for node X involves running the process 700 on node X.

First, assume that as shown in FIG. 4A, the value returned for X of X is 1. Module 746 runs the function associated with node R1 which calls node R2, which corresponds to reactive value '<P> . . . <P>' since (X==1) evaluates to TRUE.

Next, assume instead that as shown in FIG. 9, the value returned for X of X is 0. Module 746 runs the function associated with node R1 which calls node R5, which corresponds to reactive value (N+1), since (X==1) evaluates to FALSE.

Thus, as between FIGS. 4A-4C, and FIG. 9, computing node R1 for different reactive values for X between a first execution of the second example function (where X has the value 1) and a second execution of the second example function (where X has the value 0) results in different branch execution paths for the function: to node R2 the first time and to node R5 the second time.

The different branch execution paths result in changes to the hierarchy as explained with reference to FIG. 8.

FIG. 8, the processor configured to run the function also is configured to implement the process 800. Module 802 determines that R1 has a changed reactive value, and module 804 determines that R1 is a reactive value branch. Accordingly, module 806 modifies the reactive value hierarchy graph structure as shown in FIG. 9 to represent relationships among reactive values used during execution of the function using the (N+1) branch path. Node R5, which corresponds to reactive value (N+1) has been substituted in place of R2 in the hierarchy. Moreover, the strike-out (i.e. x) through the 'R2' in the R0 connect state information indicates that module 806 has removed node R2 as an input node to R0. Conversely, the presence of R5 in the R0 connect state information indicates that module 806 has added node R5 as an input to R0. Thus, reactive values corresponding to node R2 have become obsolete during execution of the function using the (N+1) branch. By the transitive property, removal of R2 also removes W1, and removal of W1 also removes nodes R3 and Y from the hierarchy. Additionally, removal of R2 also removes node W2, and removal of W2 also removes nodes R4 and Z from the hierarchy. Thus, reactive values corresponding to nodes R3, Y, R4 and Z also have become obsolete during execution of the function using the (N+1) branch, Module 808 observes the DC information associated with removed nodes that marks those nodes as possibly dirty and that acts to decrement the DC of remaining nodes (i.e. nodes that are not obsolete) dependent upon the removed possibly dirty nodes. In this example, the DC for R0 is decremented by 2 as indicated by the strike-out through "2" in the R0 state change information. Thus, R0 change state information that previously had marked node R0 as being part of a possibly 'dirty path' has been changed so that node R0 no longer is marked as being part of a possibly 'dirty path'. Accordingly, the recursive process does not traverse down from R0 to R5 in search of a dirty node. More particularly, continuing with the above example, R0 had been possibly dirty because of R1 and R2. After recomputing the path including R1, however, R1 became clean. Node R2 previously had its dirty count decremented to DC=1 (not shown), and R2 previously remained possibly dirty. In this example, node R0 has become clean due to the different branch taken in this subsequent execution of the function, which results in the reactive value corresponding to node R0 no longer depending upon the reactive value corresponding to R2. Node R2 has become obsolete and has been replaced in the hierarchy by R5. Thus, the processor is configured not only to update the hierarchy but also to clean up connectivity information and change state information that is no longer valid.

Figure 10:
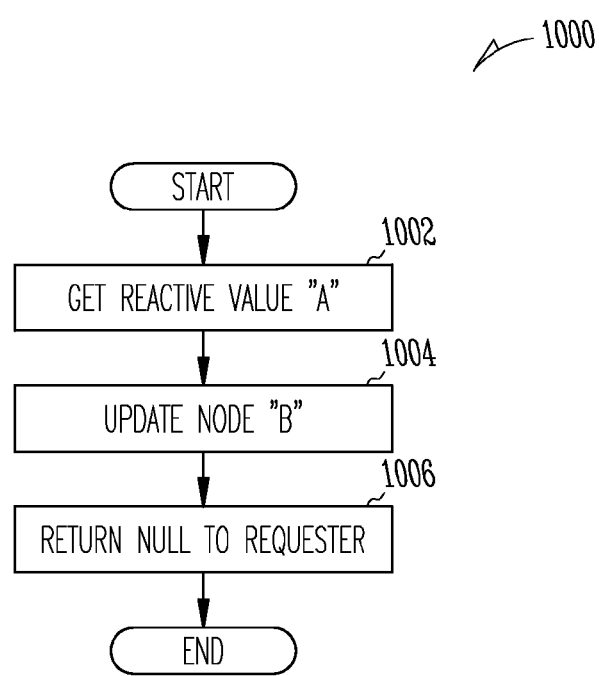
FIG. 10 is an illustrative flow diagram of the computation process performed by a watch process in accordance with some embodiments.

Watches W1 and W2 are interleaved within the reactive value hierarchy structure 400 of FIGS. 4A-4C to cause 'side-effects'. As used herein the term 'side-effect' signifies FIG. 10 is an illustrative flow diagram of the computation process performed by a watch process 1000 in accordance with some embodiments. The process 1000 is implemented with computer program code and the flow diagram represents configuration of a processor to implement the acts specified for the modules. The watches behave just as other reactive values within the hierarchy. The process 1000 represents the reactive value compute performed by the example watches. Module 1002 gets a reactive value "A" from a node within the hierarchy. Module 1004 uses the obtained reactive value "A" to update node "B" within the hierarchy. Module 1006 returns the 'null' value to the recursive process requesting that the watch perform the compute. Thus, each watch includes two parameters: a 'get node' where the watch gets a reactive value and a 'put node' where a reactive value puts the reactive value.

Figure 11A:
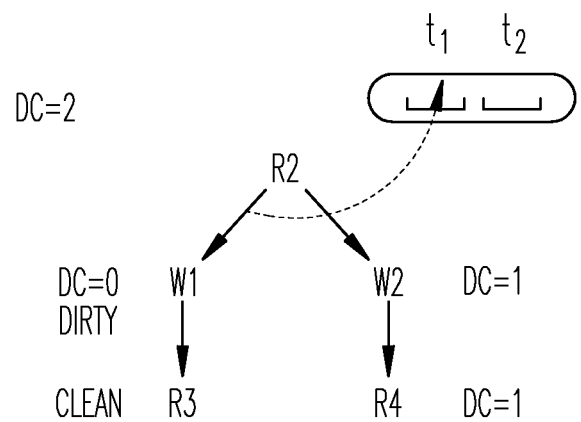
FIGS. 11A-11B are illustrative drawings of portions of the graph of FIGS. 4A-4C during running of the recursive process of FIGS. 7A-7C.
Figure 11B:
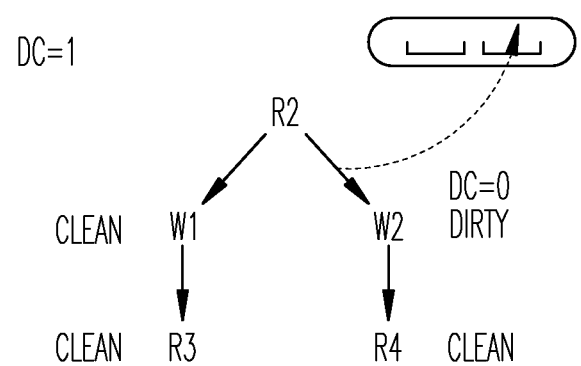

FIGS. 11A-11B are illustrative drawings of portions of the graph of FIGS. 4A-4C during running of the recursive process of FIGS. 7A-7C, assuming in this example, however, that values for Y and Z changed but not the value for X, such that the function executes along the same branch it used during the first time that it execution. Referring to the example in FIG. 11A, assume that the recursive process has reached a stage in which the change data for W1 indicates that W1 is dirty. The role of node R2 is to construct a DOM node <p> . . . <p> using a Browser API and values for text node "t1" and "t2" provided as explained below, by the watches W1 and W2.

For the purposes of this example, the get node for W1 is R3, and the put node of W1 is a first text node "t1" within the DOM node demarcated by <p> . . . <p>. It will be appreciated that the reactive value corresponding to R2 is an HTML tag that contains the text expression for the reactive values of nodes R3 and R4 within a paragraph tag. Since W1 is dirty, W1 computes. As W1 computes according to the process 1000, module 1002 gets the reactive value computed in R3 and module 1004 places that computed value in the left side text node "t1" within the DOM node. Module 1006 returns the value 'null' to R2, which is the same value that it always returns. Accordingly, module 748 of FIG. 7B detects no change, and the DC of R2 is decremented pursuant to module 754. However, node R2 is not marked dirty since there was no perceived change in the value of W1: the W1 value was null before the compute, and it is null after the compute. Thus, for example, the watch. W1 changes a tangible manifestation of the DOM on a computing device screen without propagating dirty state upward through the hierarchy. In other words, the traversal associated with W1 fizzles out in the hierarchy with W1.

Referring now to the example in FIG. 11B, assume that the recursive process has reached a stage in which the change data for W2 indicates that W2 is dirty. Note that W1 and W2 compute in order in which the reactive values they use are utilized by the function. The get node for W2 is R4, and the put node of W2 is a first text node "t2" within the DOM node demarcated by <p> . . . =p>. Since W2 is dirty, W2 computes. As W2 computes, module 1002 gets the reactive value computed in R4 and module 1004 places that computed value in the right side text node "t2" within the DOM node. Module 1006 returns the value 'null' to R2, which is the same value that it always returns. The DC of R2 is decremented. Node R2 is not marked dirty since there was no perceived change in the value of W2: the W2 value was null before the compute, and it is null after the compute. Thus, for example, the watch W2, like the watch module W1, changes a tangible manifestation of the DOM on a computing device screen without propagating dirty state upward through the hierarchy. In other words, the traversal associated with W1 fizzles out in the hierarchy with W1.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system., it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
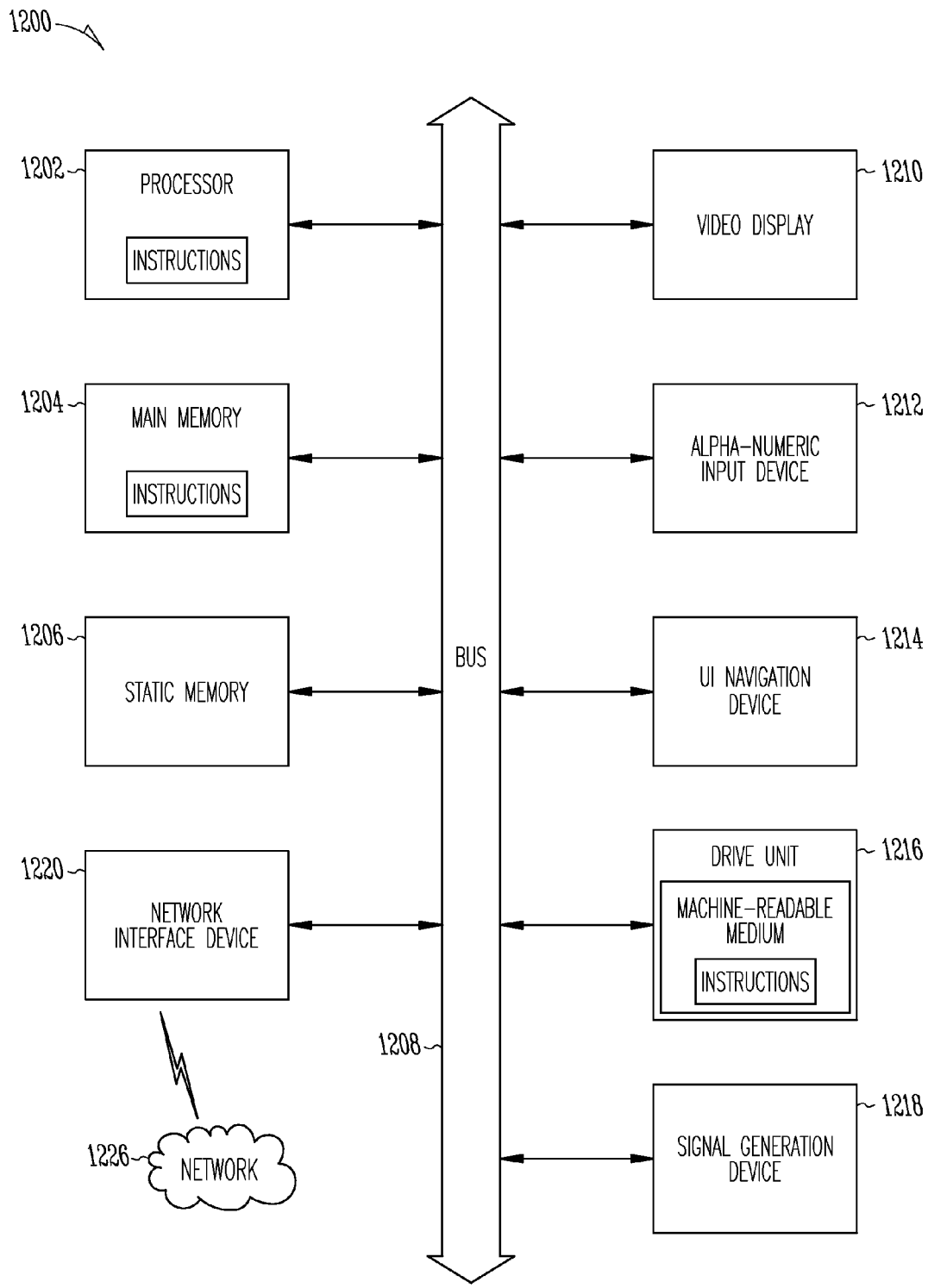
FIG. 12 is an illustrative block diagram of machine in the example form of a computer system within which a set instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220. The processor 1202 can be used to run the processes and to perform the functions described herein and to create the hierarchies described herein.

Machine-Readable Storage Device

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 700, the main memory 1204 and the processor 1202 also constituting machine-readable media.

While the machine-readable storage device 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks. The machine readable storage devices described herein can store code to implement the information structures and code to execute processes and functions described herein.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks. Plain Old Telephone (POTS) networks, and wireless data networks (e.g., WiFi and WiMax networks). The term "transmission medium" shall be taken to include any non-transitory tangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    configuring a processor to execute a function first time;
    in the course of execution of the function, producing a reactive value hierarchy structure in a non-transitory computer readable storage device that includes a plurality of respective nodes that correspond to respective reactive values used in the first execution of the function and that indicates relationships among nodes that correspond to relationships among corresponding reactive values during the first execution of the function;
    wherein respective nodes in the hierarchy act as dependent nodes to other nodes lower in the hierarchy that act as inputs nodes to the respective nodes;
    wherein the respective nodes act as input nodes to the other nodes higher in the hierarchy that act as dependent nodes to the respective nodes; and
    wherein respective nodes are associated with respective ordered sets of one or more input nodes ordered according to order of use of their corresponding reactive values during the first execution of the function;
    identifying one or more changed reactive values associated with one or more nodes;
    traversing upward within the hierarchy starting from the nodes identified as having changed reactive values to identify multiple nodes within the hierarchy that are possibly dirty due to the one or more identified reactive value changes;
    associating dirty state and dirty count information in the storage device with the multiple nodes identified as possibly dirty; configuring the processor to execute the function a second time using the changed reactive values;
    wherein configuring the processor to execute the function a second time includes:
    configuring the processor to recursively run a process to ensure current reactive values for the nodes within the hierarchy;
    wherein the process includes:
    monitoring dirty state information and dirty count information associated with a given node;
    while the dirty state information associated with the given node indicates not dirty and the dirty count information of the given node indicates that the given node is possibly dirty, requesting the process in order one at a time on successive ordered input nodes to the given node;
    when the dirty state information associated with the given node is dirty, computing a current reactive value for the given node and decrementing the dirty count information of direct dependent nodes of the of the given node and if the computed current reactive value for the given node is changed then marking as dirty, dirty state information associated with direct dependent nodes of the given node; and
    when the dirty state information associated with the given node indicates not dirty and the dirty count information indicates that the given node is not dirty, returning a current reactive value of the given node to a dependent node that requested performing the process on the given node.

2. The method of claim 1,
    wherein computing a current reactive value includes requesting the process on each input node to the given node.

3. The method of claim 1 further including:
    decrementing the dirty count information of the given node upon occurrence of computing the current reactive value.

4. The method of claim 1 further including:
    returning the computed current reactive value of the given node to the dependent node that requested performing of the process on the given node.

5. The method of claim 1 further including:
    marking as not dirty, dirty state information associated with the given node upon occurrence of computing the current reactive value.

6. The method of claim 1 further including:
    marking as not dirty, dirty state information associated with the given node upon occurrence of computing the current reactive value;
    wherein returning the current reactive value of the given node to a dependent node that requested performing the process on the given node involves returning the computed current reactive value.

7. The method of claim 1,
    wherein dirty information state of an associated node is indicative of whether a reactive value of that associated node changed due to the received reactive value change.

8. The method of claim 1,
    wherein dirty count information of an associated node is indicative of number of nodes that are direct inputs to that associated node have reactive values that possibly changed due to the received reactive value change.

9. A method comprising:

configuring a processor to execute a function first time;

in the course of execution of the function, producing a reactive value hierarchy structure in a non-transitory computer readable storage device that includes a plurality of respective nodes that correspond to respective reactive values used in the first execution of the function and that indicates relationships among nodes that correspond to relationships among corresponding reactive values during the first execution of the function;

wherein respective nodes in the hierarchy act as dependent nodes to other nodes lower in the hierarchy that act as inputs nodes to the respective nodes; wherein the respective nodes act as input nodes to the other nodes higher in the hierarchy that act as dependent nodes to the respective nodes; and wherein respective nodes are associated with respective ordered sets of one or more input nodes ordered according to order of use of their corresponding reactive values during the first execution of the function;

in response to a change in a reactive value corresponding to a node in the hierarchy, marking nodes within the hierarchy that share a path with a node corresponding to a changed reactive value with indicia to indicate that they are possibly dirty;

configuring the processor to execute the function a second time;

in the course of executing the function the second time, configuring the processor to perform a recursive process that includes:

traversing down through one or more levels of the hierarchy following a path indicated by the marking that includes a possibly dirty node from the lowest order input node not yet traversed at successive levels of the hierarchy to a level where the reactive value has changed;

determining whether the changed reactive value indicates that the reactive value of the dependent node at a next level above in the hierarchy that was most recently traversed down from is dirty or clean;

if the reactive value of the dependent node at a next level above in the hierarchy that was most recently traversed down from is determined to be dirty then computing a new reactive value for that node;

if the reactive value of the dependent node at a next level above in the hierarchy that was most recently traversed down from is determined to be clean then traversing back up to a dependent node at a next level above in the hierarchy that was most recently traversed down from and repeating the traversing down step;

determining whether the computed new reactive value results in one or more reactive values in the hierarchy being obsolete; and removing from one or more nodes in the hierarchy a marking that indicates a shared path with a possibly dirty node that is obsolete.

10. The method of claim 9, wherein the step of executing the function the second time includes performing the recursive process for multiple different paths indicated by the marking as including a possibly dirty node.

11. The method of claim 9, wherein the step of executing the function the second time includes performing the recursive process for each of multiple different paths indicated by the marking as including a possibly dirty node; and wherein the step of removing from one or more nodes in the hierarchy a marking that indicates a shared path with a possibly dirty node avoids performing the recursive process for the path that had been indicated by the removed marking.

12. The method of claim 9, wherein determining whether the computed new reactive value results in one or more reactive values in the hierarchy being obsolete involves determining whether the function branched to an execution path the second time that is different from an execution path that the function branched to the first time.

13. An article of manufacture that includes a non-transitory computer readable storage device encode with program code to cause a processor to perform a process comprising: configuring a processor to execute a function first time;

in the course of execution of the function, producing a reactive value hierarchy structure in a non-transitory computer readable storage device that includes a plurality of respective nodes that correspond to respective reactive values used in the first execution of the function and that indicates relationships among nodes that correspond to relationships among corresponding reactive values during the first execution of the function;

wherein respective nodes in the hierarchy act as dependent nodes to other nodes lower in the hierarchy that act as inputs nodes to the respective nodes;

wherein the respective nodes act as input nodes to the other nodes higher in the hierarchy that act as dependent nodes to the respective nodes; and wherein respective nodes are associated with respective ordered sets of one or more input nodes ordered according to order of use of their corresponding reactive values during the first execution of the function;

identifying one or more changed reactive values associated with one or more nodes; traversing upward within the hierarchy starting from the nodes identified as having changed reactive values to identify multiple nodes within the hierarchy that are possibly dirty due to the one or more identified reactive value changes;

associating dirty state and dirty count information in the storage device with the multiple nodes identified as possibly dirty; configuring the processor to execute the function a second time using the changed reactive values;

wherein configuring the processor to execute the function a second time includes:

configuring the processor to recursively run a process to ensure current reactive values for the nodes within the hierarchy;

wherein the process includes:

monitoring dirty state information and dirty count information associated with a given node;

while the dirty state information associated with the given node indicates not dirty and the dirty count information of the given node indicates that the given node is possibly dirty, requesting the process in order one at a time on successive ordered input nodes to the given node;

when the dirty state information associated with the given node is dirty, computing a current reactive value for the given node and decrementing the dirty count information of direct dependent nodes of the of the given node and if the computed current reactive value for the given node is changed then marking as dirty, dirty state information associated with direct dependent nodes of the given node; and when the dirty state information associated with the given node indicates not dirty and the dirty count information indicates that the given node is not dirty, returning a current reactive value of the given node to a dependent node that requested performing the process on the given node.

14. A system that includes a processor and a computer readable storage device and a communication bus connecting the processor and the device, wherein the computer readable storage device is encoded with program code to cause the processor to perform a process comprising:

configuring a processor to execute a function first time;

in the course of execution of the function, producing a reactive value hierarchy structure in a non-transitory computer readable storage device that includes a plurality of respective nodes that correspond to respective reactive values used in the first execution of the function and that indicates relationships among nodes that correspond to relationships among corresponding reactive values during the first execution of the function;

wherein respective nodes in the hierarchy act as dependent nodes to other nodes lower in the hierarchy that act as inputs nodes to the respective nodes;

wherein the respective nodes act as input nodes to the other nodes higher in the hierarchy that act as dependent nodes to the respective nodes; and wherein respective nodes are associated with respective ordered sets of one or more input nodes ordered according to order of use of their corresponding reactive values during the first execution of the function;

identifying one or more changed reactive values associated with one or more nodes; traversing upward within the hierarchy starting from the nodes identified as having changed reactive values to identify multiple nodes within the hierarchy that are possibly dirty due to the one or more identified reactive value changes;

associating dirty state and dirty count information in the storage device with the multiple nodes identified as possibly dirty; configuring the processor to execute the function a second time using the changed reactive values;

wherein configuring the processor to execute the function a second time includes:

configuring the processor to recursively run a process to ensure current reactive values for the nodes within the hierarchy;

wherein the process includes:

monitoring dirty state information and dirty count information associated with a given node;

while the dirty state information associated with the given node indicates not dirty and the dirty count information of the given node indicates that the given node is possibly dirty, requesting the process in order one at a time on successive ordered input nodes to the given node;

when the dirty state information associated with the given node is dirty, computing a current reactive value for the given node and decrementing the dirty count information of direct dependent nodes of the of the given node and if the computed current reactive value for the given node is changed then marking as dirty, dirty state information associated with direct dependent nodes of the given node; and when the dirty state information associated with the given node indicates not dirty and the dirty count information indicates that the given node is not dirty, returning a current reactive value of the given node to a dependent node that requested performing the process on the given node.

15. An article of manufacture that includes a non-transitory computer readable storage device encode with program code to cause a processor to perform a process comprising:

configuring a processor to execute a function first time;

in the course of execution of the function, producing a reactive value hierarchy structure in a non-transitory computer readable storage device that includes a plurality of respective nodes that correspond to respective reactive values used in the first execution of the function and that indicates relationships among nodes that correspond to relationships among corresponding reactive values during the first execution of the function;

wherein respective nodes in the hierarchy act as dependent nodes to other nodes lower in the hierarchy that act as inputs nodes to the respective nodes;

wherein the respective nodes act as input nodes to the other nodes higher in the hierarchy that act as dependent nodes to the respective nodes; and wherein respective nodes are associated with respective ordered sets of one or more input nodes ordered according to order of use of their corresponding reactive values during the first execution of the function;

in response to a change in a reactive value corresponding to a node in the hierarchy, marking nodes within the hierarchy that share a path with a node corresponding to a changed reactive value with indicia to indicate that that they are possibly dirty;

configuring the processor to execute the function a second time;

in the course of executing the function the second time, configuring the processor to perform a recursive process that includes:

traversing down through one or more levels of the hierarchy following a path indicated by the marking that includes a possibly dirty node from the lowest order input node not yet traversed at successive levels of the hierarchy to a level where the reactive value has changed;

determining whether the changed reactive value indicates that the reactive value of the dependent node at a next level above in the hierarchy that was most recently traversed down from is dirty or clean;

if the reactive value of the dependent node at a next level above in the hierarchy that was most recently traversed down from is determined to be dirty then computing a new reactive value for that node;

if the reactive value of the dependent node at a next level above in the hierarchy that was most recently traversed down from is determined to be clean then traversing back up to a dependent node at a next level above in the hierarchy that was most recently traversed down from and repeating the traversing down step;

determining whether the computed new reactive value results in one or more reactive values in the hierarchy being obsolete; and removing from one or more nodes in the hierarchy a marking that indicates a shared path with a possibly dirty node that is obsolete.

16. A system that includes a processor and a computer readable storage device and a communication bus connecting the processor and the device, wherein the computer readable storage device is encoded with program code to cause the processor to perform a process comprising:

configuring a processor to execute a function first time;

in the course of execution of the function, producing a reactive value hierarchy structure in a non-transitory computer readable storage device that includes a plurality of respective nodes that correspond to respective reactive values used in the first execution of the function and that indicates relationships among nodes that correspond to relationships among corresponding reactive values during the first execution of the function;

wherein respective nodes in the hierarchy act as dependent nodes to other nodes lower in the hierarchy that act as inputs nodes to the respective nodes;

wherein the respective nodes act as input nodes to the other nodes higher in the hierarchy that act as dependent nodes to the respective nodes; and wherein respective nodes are associated with respective ordered sets of one or more input nodes ordered according to order of use of their corresponding reactive values during the first execution of the function;

in response to a change in a reactive value corresponding to a node in the hierarchy, marking nodes within the hierarchy that share a path with a node corresponding to a changed reactive value with indicia to indicate that they are possibly dirty;

configuring the processor to execute the function a second time;

in the course of executing the function the second time, configuring the processor to perform a recursive process that includes:

traversing down through one or more levels of the hierarchy following a path indicated by the marking that includes a possibly dirty node from the lowest order input node not yet traversed at successive levels of the hierarchy to a level where the reactive value has changed;

determining whether the changed reactive value indicates that the reactive value of the dependent node at a next level above in the hierarchy that was most recently traversed down from is dirty or clean;

if the reactive value of the dependent node at a next level above in the hierarchy that was most recently traversed down from is determined to be dirty then computing a new reactive value for that node;

if the reactive value of the dependent node at a next level above in the hierarchy that was most recently traversed down from is determined to be clean then traversing back up to a dependent node at a next level above in the hierarchy that was most recently traversed down from and repeating the traversing down step;

determining whether the computed new reactive value results in one or more reactive values in the hierarchy being obsolete; and removing from one or more nodes in the hierarchy a marking that indicates a shared path with a possibly dirty node that is obsolete.

\* \* \* \* \*

UNITED STATES PATENT AND TRADEMARK OFFICE
CERTIFICATE OF CORRECTION

PATENT NO. : 8,627,199 B1  
APPLICATION NO. : 13/038356  
DATED : January 7, 2014  
INVENTOR(S) : Handley et al.

Page 1 of 1

It is certified that error appears in the above-identified patent and that said Letters Patent is hereby corrected as shown below:

On the Title Page, Item (56)

In column 2, under "Other Publications", line 6, delete "13/017,730 ," and insert --13/017,730,--, therefor In column 2, under "Other Publications", line 8, delete "13/017,730 ," and insert --13/017,730,--, therefor In column 2, under "Other Publications", line 9, delete "2012"" and insert --2012",--, therefor In the Claims In column 24, line 6, in Claim 1, after "dirty;", insert --¶--, therefor In column 25, line 15, in Claim 9, after "nodes;", insert --¶--, therefor In column 26, line 17, in Claim 13, after "comprising:", insert --¶--, therefor In column 26, line 38, in Claim 13, after "nodes;", insert --¶--, therefor In column 26, line 45, in Claim 13, after "dirty;", insert --¶--, therefor In column 27, line 35, in Claim 14, after "nodes;", insert --¶--, therefor In column 27, line 42, in Claim 14, after "dirty;", insert --¶--, therefor In column 28, line 30, in Claim 15, after "indicate", delete "that", therefor In column 30, line 24, in Claim 16, after "and", insert --¶--, therefor Signed and Sealed this  
Second Day of December, 2014

Michelle K. Lee  
*Deputy Director of the United States Patent and Trademark Office*